(12) United States Patent
Ross et al.

(10) Patent No.: US 12,040,608 B2
(45) Date of Patent: Jul. 16, 2024

(54) POWER MANAGEMENT APPARATUS FOR ENERGY HARVESTING

(71) Applicant: Trameto Limited, Penarth (GB)

(72) Inventors: Mark Ross, San Carlos, CA (US);
Laurence Alan Strong, Bristol (GB);
Robert Robertson, Bristol (GB)

(73) Assignee: Trameto Limited, Penarth (GB)

( * ) Notice: Subject to any disclaimer, the term of this patent is extended or adjusted under 35 U.S.C. 154(b) by 77 days.

(21) Appl. No.: 17/718,328

(22) Filed: Apr. 12, 2022

(65) Prior Publication Data
US 2023/0327435 A1 Oct. 12, 2023

(51) Int. Cl.
| | |
|---|---|
| *H02J 50/00* | (2016.01) |
| *H02J 1/12* | (2006.01) |
| *H02J 3/46* | (2006.01) |
| *H02J 7/00* | (2006.01) |
| *H02M 1/10* | (2006.01) |
| *H02M 3/156* | (2006.01) |
| *H02M 5/293* | (2006.01) |

(52) U.S. Cl.
CPC ............... *H02J 1/12* (2013.01); *H02J 3/46* (2013.01); *H02J 7/00712* (2020.01); *H02J 50/001* (2020.01); *H02M 1/10* (2013.01); *H02M 3/156* (2013.01); *H02M 5/2935* (2021.05); *H02J 2207/20* (2020.01)

(58) Field of Classification Search
CPC .. H02J 50/001; H02J 50/40; H02J 1/12; H02J 3/46; H02J 7/00712; H02J 2207/20; H02M 1/10; H02M 3/156; H02M 5/2935
See application file for complete search history.

(56) References Cited

U.S. PATENT DOCUMENTS

| | | | | |
|---|---|---|---|---|
| 2005/0264271 A1* | 12/2005 | Lam | .................. | H02M 1/10 323/282 |
| 2014/0111015 A1* | 4/2014 | Fall | ................ | H01L 31/02021 323/299 |
| 2016/0049822 A1* | 2/2016 | Lee | .................. | G06F 1/28 307/66 |
| 2017/0237282 A1* | 8/2017 | Huang | ................ | H02J 7/345 307/48 |
| 2022/0416660 A1* | 12/2022 | Zhou | .................. | H02M 7/5387 |

* cited by examiner

Primary Examiner — Harry R Behm
(74) Attorney, Agent, or Firm — Winstead PC

(57) ABSTRACT

A power management apparatus 20 comprises a first energy harvesting input channel 21; a first energy storage element connection 25; an inductor connection 27; and a switching circuit 28. A controller 30 is configured to operate the switching circuit 28 to transfer energy between the first energy harvesting input channel 21 and the first energy storage element connection 25 by a sequence of energy transfer cycles. Each of the energy transfer cycles comprises an energise phase in which energy is transferred from the first energy harvesting input channel 21 to the inductor connection 25 for an energise time (tE) and a de-energise phase. The first energy harvesting input channel 21 is capable of receiving an AC electrical signal and a DC electrical signal. The controller 30 is configured to determine a type of an electrical signal received at the first energy harvesting input channel 21, where the type is one of an AC electrical signal and a DC electrical signal, and determine an energise time (tE) and a harvesting cycle period (tP) for the switching circuit 28 based on the determined type.

43 Claims, 13 Drawing Sheets

AC (POSITIVE PORTION)
DC (POSITIVE POLARITY ON IN(A))

AC (NEGATIVE PORTION)
DC (POSITIVE POLARITY ON IN(B))

DC MODE: FIXED tE

POWER MANAGEMENT APPARATUS FOR ENERGY HARVESTING

BACKGROUND OF THE INVENTION

Energy harvesting generates usable electrical energy from energy sources in the environment. Energy can be harvested from sources such as ambient light, movement and thermal energy. The electrical energy is typically stored and then used to power electrical loads, such as electronic devices.

Examples of energy harvesting transducers are: a photovoltaic (PV) cell which generates an electrical output in response to light; a thermoelectric generator (TEG) which generates an electrical output in response to a temperature difference; a piezoelectric transducer which generates an electrical output in response to mechanical strain across the transducer; and an electrodynamic transducer which generates an electrical output in response to vibrations. The electrical energy from transducers can be stored in any suitable storage device.

A power management unit (PMU) or power management integrated circuit (PMIC) may connect to multiple energy harvesting transducers to increase the amount of harvested energy. The PMU may connect to energy harvesting transducers of the same type (e.g. a plurality of PV cells) or the PMU may connect to energy harvesting transducers of different types (e.g. a PV cell and a TEG). The outputs of the various types of energy harvesting transducers have a wide range of different electrical characteristics. For example, the electrical outputs of energy harvesting transducers can have voltages which range from tens of millivolts (mV) to tens of Volts, and currents which range from microamps ($\mu$A) to milliamps (mA). The electrical output can be steady or bursty, and can be direct current (DC) or alternating current (AC). Also, the amount of harvested energy can vary according to ambient conditions. For example, the output of PV cells varies according to illumination level. This range of electrical characteristics and variation in energy outputs presents challenges when attempting to provide a PMU which connects to multiple energy harvesting sources.

SUMMARY OF THE INVENTION

Aspects of the present invention provide a power management apparatus, a power management system, a controller, a method and a computer program according to the appended claims.

An aspect provides a power management apparatus comprising:
a first energy harvesting input channel for connecting to a first electrical energy harvesting source;
a first energy storage element connection for connecting to an energy storage element;
an inductor connection for connecting to an inductor;
a switching circuit which is configured to selectively connect to the first energy harvesting input channel, the inductor connection and the first energy storage element connection; and
a controller which is configured to:
operate the switching circuit to transfer energy between the first energy harvesting input channel and the first energy storage element connection by a sequence of energy transfer cycles, each of the energy transfer cycles comprising:

an energise phase in which energy is transferred from the first energy harvesting input channel to the inductor connection for an energise time (tE) to transfer energy to the inductor and;
a de-energise phase in which energy is transferred from the inductor connection to the first energy storage element connection for a de-energise time (tD),
wherein the first energy harvesting input channel is allocated a plurality of the energy transfer cycles, with a harvesting cycle period (tP) between start times of successive energy transfer cycles;
wherein the first energy harvesting input channel is capable of receiving an AC electrical signal and a DC electrical signal and the controller is configured to determine a type of an electrical signal received at the first energy harvesting input channel, where the type is one of an AC electrical signal and a DC electrical signal, and determine an energise time (tE) and a harvesting cycle period (tP) for the switching circuit based on the determined type.

Optionally, when the type of electrical signal received at the first energy harvesting input channel is determined to be an AC electrical signal, the controller is configured to determine a period of the AC electrical signal and to determine the harvesting cycle period (tP) for the first energy harvesting input channel based on the period of the AC electrical signal.

Optionally, the harvesting cycle period (tP) for the first energy harvesting input channel is a fraction of the period of the AC electrical signal. For example, the harvesting cycle period (tP) for the first energy harvesting input channel may be an integer fraction of the period of the AC electrical signal, such as one eighth of the period of the AC electrical signal.

Optionally, when the type of electrical signal received at the first energy harvesting input channel is determined to be an AC electrical signal, the controller is configured to: select a value of the harvesting cycle period (tP) as a constant value; and adjust the energise time (tE) to control an amount of power transferred from the first electrical energy harvesting source connected to the first energy harvesting input channel.

Optionally, the controller is configured to determine a value of the energise time (tE) which transfers a maximum power from the first electrical energy harvesting source connected to the first energy harvesting input channel.

Optionally, when the type of electrical signal received at the first energy harvesting input channel is determined to be an AC electrical signal, the controller is configured to determine a parameter indicative of power transferred from the first energy harvesting input channel at a controlled offset time with respect to a start of an AC cycle of the AC electrical signal.

Optionally, the controlled offset time is a peak region of the AC electrical signal.

Optionally, the controller is configured to:
select a value of the harvesting cycle period (tP) as a constant value; and
select a first value of the energise time (tE);
determine a first parameter indicative of power transferred from the first energy harvesting input channel at a first offset time with respect to a start of an AC cycle of the AC electrical signal;
select a second value of the energise time (tE); and
determine a second parameter indicative of power transferred from the first energy harvesting input channel at the first offset time with respect to a start of an AC cycle of the AC electrical signal.

Optionally, the controller is configured to:
select a value of the harvesting cycle period (tP) as a constant value; and
select a first value of the energise time (tE);
determine a first parameter indicative of power transferred from the first energy harvesting input channel at a first offset time with respect to a start of an AC cycle of the AC electrical signal;
select a second value of the energise time (tE);
determine a second parameter indicative of power transferred from the first energy harvesting input channel at a second offset time with respect to a start of an AC cycle of the AC electrical signal.

Optionally, the controller is configured to adjust at least one of the first parameter and the second parameter based on the respective offset time.

Optionally, when the type of electrical signal received at the first energy harvesting input channel is determined to be an AC electrical signal, the controller is configured to determine a parameter indicative of power transferred from the first energy harvesting input channel by:
determining a plurality of parameters indicative of power transferred from the first energy harvesting input channel at a plurality of offset times with respect to a start of an AC cycle of the AC electrical signal; and
averaging the plurality of parameters.

This has an advantage of allowing flexibility when the parameters are determined. This can allow the inductor to be used for other input channels, or for other functions.

Optionally, the apparatus comprises a first input stage connected to the first energy harvesting input channel and wherein, when the type of electrical signal received at the first energy harvesting input channel is determined to be an AC electrical signal, the controller is configured to cause the first input stage to convert negative voltage portions of the AC electrical signal to positive voltages.

Optionally, the first energy harvesting input channel comprises a first input line and a second input line and the controller is configured to determine a type of an electrical signal received at the first energy harvesting input channel by detecting a relative polarity of a signal on the first input line and a signal on the second input line. The controller may also be configured to determine a type of an electrical signal based on a time between changes in the relative polarity of a signal on the first input line and a signal on the second input line. A point at which there is a change in relative polarity will be called a zero-crossing point. A relatively short period between zero-crossing points and/or a consistent period between zero-crossing points indicates an AC electrical signal. An absence of zero crossing points indicates a DC electrical signal. A long period between zero-crossing points indicates a quasi-DC electrical signal.

Optionally, when the type of electrical signal received at the first energy harvesting input channel is determined to be a DC electrical signal, the controller is configured to:
select a value of the energise time (tE) as a constant value; and
adjust the harvesting cycle period (tP) to control an amount of power transferred from the electrical energy harvesting source connected to the energy harvesting input channel.

Optionally, the controller is configured to determine a value of the harvesting cycle period (tP) which transfers a maximum power from the electrical energy harvesting source connected to the first energy harvesting input channel.

Optionally, the controller is configured to determine a measure indicative of power transferred from the first energy harvesting input channel by measuring the de-energise time (tD) of the de-energise phase.

Optionally, the first input stage comprises:
a first input line and a second input line;
a first branch and a second branch connected between the first input line and the second input line, the first branch comprising a first switching device and a second switching device connected in series and the second branch comprising a third switching device and a fourth switching device connected in series;
an output line connected to a mid-point of the first branch;
a ground connection to a mid-point of the second branch;
wherein the controller is configured to selectively:
operate the switching devices in a first configuration, wherein the first switching device is closed to connect the first input line to the output line and the fourth switching device is closed to connect the second input line to ground; and
operate the switching devices in a second configuration, wherein the second switching device is closed to connect the second input line to the output line and the third switching device is closed to connect the first input line to ground.

Optionally, the controller is configured to operate the switching devices in the first configuration when there is a positive relative difference between the first input line and the second input line and to operate the switching devices in the second configuration when there is a positive relative difference between the second input line and the first input line.

Optionally, the apparatus comprises a second energy harvesting input channel for connecting to a second electrical energy harvesting source; wherein the switching circuit is configured to selectively connect to the second energy harvesting input channel; and
the controller is configured to operate the switching circuit to transfer energy between each of the energy harvesting input channels and the first energy storage element output by a sequence of energy transfer cycles in a time-multiplexed manner.

Optionally, the second energy harvesting input channel is capable of receiving an AC electrical signal and a DC electrical signal and the controller is configured to determine a type of an electrical signal received at the second energy harvesting input channel, where the type is one of an AC electrical signal and a DC electrical signal, and determine an energise time (tE) and a harvesting cycle period (tP) for the switching circuit based on the determined type.

Optionally, the apparatus comprises a larger number of energy harvesting input channels. Each of the energy harvesting input channels may be capable of receiving an AC electrical signal and a DC electrical signal, or a subset of the total number of energy harvesting input channels may be capable of receiving an AC electrical signal and a DC electrical signal.

Optionally, the power management apparatus comprises a load output, the switching circuit is configured to selectively connect to the load output and the controller is also configured to operate the switching circuit to transfer energy from the first energy storage element connection to the load output via the inductor connection.

Optionally, the controller is configured to operate the switching circuit to transfer energy from the first energy storage element connection to the load output by a plurality of transfer cycles, each transfer cycle comprising:
  an energise phase in which energy is transferred from the first energy storage element connection to the inductor connection for an energise time (tE) to transfer energy to the inductor and;
  a de-energise phase in which energy is transferred from the inductor connection to the load output for a de-energise time (tD).

Optionally, the controller is configured, during operation, to:
  determine if the first energy harvesting input channel is operating substantially at a maximum power point; and
  if the first energy harvesting input channel is no longer operating substantially at a maximum power point, determine a new energise time (tE) and a new harvesting cycle period (tP) for the first energy harvesting input channel.

Another aspect provides a power management system comprising:
  a power management apparatus;
  an inductor connected to the inductor connection of the power management apparatus;
  a first energy store connected to the first energy storage element connection of the power management apparatus.

Another aspect provides a method of controlling a power management apparatus, the power management apparatus comprising an inductor connection for connecting to an inductor, a first energy harvesting input channel for connecting to a first electrical energy harvesting source, a first energy storage element output for connecting to an energy storage element and a switching circuit, the method comprising:
  operating the switching circuit to transfer energy between the first energy harvesting input channel and the first energy storage element connection by a sequence of energy transfer cycles, each of the energy transfer cycles comprising:
    an energise phase in which energy is transferred from the first energy harvesting input channel to the inductor connection for an energise time (tE) to transfer energy to the inductor and;
    a de-energise phase in which energy is transferred from the inductor connection to the first energy storage element connection for a de-energise time (tD),
  wherein the first energy harvesting input channel is allocated a plurality of the energy transfer cycles, with a harvesting cycle period (tP) between start times of successive energy transfer cycles;
  wherein the first energy harvesting input channel is capable of receiving an AC electrical signal and a DC electrical signal and the controller is configured to determine a type of an electrical signal received at the first energy harvesting input channel, where the type is one of an AC electrical signal and a DC electrical signal, and determine an energise time (tE) and a harvesting cycle period (tP) for the switching circuit based on the determined type.

Optionally, when the type of electrical signal received at the first energy harvesting input channel is determined to be an AC electrical signal, determining a period of the AC electrical signal and determining the harvesting cycle period (tP) for the first energy harvesting input channel based on the period of the AC electrical signal.

Optionally, the harvesting cycle period (tP) for the first energy harvesting input channel is a fraction of the period of the AC electrical signal.

Optionally, when the type of electrical signal received at the first energy harvesting input channel is determined to be an AC electrical signal:
  selecting a value of the harvesting cycle period (tP) as a constant value; and
  adjusting the energise time (tE) to control an amount of power transferred from the first electrical energy harvesting source connected to the first energy harvesting input channel.

Optionally, the method comprises determining a value of the energise time (tE) which transfers a maximum power from the electrical energy harvesting source connected to the first energy harvesting input channel.

Optionally, when the type of electrical signal received at the first energy harvesting input channel is determined to be an AC electrical signal, determining a parameter indicative of power transferred from the first energy harvesting input channel at a controlled offset time with respect to a start of an AC cycle of the AC electrical signal.

Optionally, the controlled offset time is a peak region of the AC electrical signal.

Optionally, the method comprises:
  selecting a value of the harvesting cycle period (tP) as a constant value; and
  selecting a first value of the energise time (tE);
  determining a first parameter indicative of power transferred from the first energy harvesting input channel at a first offset time with respect to a start of an AC cycle of the AC electrical signal;
  selecting a second value of the energise time (tE); and
  determining a second parameter indicative of power transferred from the first energy harvesting input channel at the first offset time with respect to a start of an AC cycle of the AC electrical signal.

Optionally, the method comprises:
  selecting a value of the harvesting cycle period (tP) as a constant value; and
  selecting a first value of the energise time (tE);
  determining a first parameter indicative of power transferred from the first energy harvesting input channel at a first offset time with respect to a start of an AC cycle of the AC electrical signal;
  selecting a second value of the energise time (tE);
  determining a second parameter indicative of power transferred from the first energy harvesting input channel at a second offset time with respect to a start of an AC cycle of the AC electrical signal.

Optionally, the method comprises adjusting at least one of the first parameter and the second parameter based on the respective offset time.

Optionally, when the type of electrical signal received at the first energy harvesting input channel is determined to be an AC electrical signal, the method comprises determining a parameter indicative of power transferred from the first energy harvesting input channel by:
  determining a plurality of parameters indicative of power transferred from the first energy harvesting input channel at a plurality of offset times with respect to a start of an AC cycle of the AC electrical signal; and
  averaging the plurality of parameters.

Optionally, the power management apparatus comprises a first input stage connected to the first energy harvesting input channel and the method comprises, when the type of electrical signal received at the first energy harvesting input channel is determined to be an AC electrical signal, causing the first input stage to convert negative voltage portions of the AC electrical signal to positive voltages.

Optionally, the first energy harvesting input channel comprises a first input line and a second input line and the method comprises determining a type of an electrical signal received at the first energy harvesting input channel by detecting a relative polarity of a signal on the first input line and a signal on the second input line.

Optionally, when the type of electrical signal received at the first energy harvesting input channel is determined to be a DC electrical signal:
selecting a value of the energise time (tE) as a constant value; and
adjusting the harvesting cycle period (tP) to control an amount of power transferred from the electrical energy harvesting source connected to the energy harvesting input channel.

Optionally, the method comprises determining a value of the harvesting cycle period (tP) which transfers a maximum power from the electrical energy harvesting source connected to the first energy harvesting input channel.

Optionally, the method comprises determining a measure indicative of power transferred from the first energy harvesting input channel by measuring the de-energise time (tD) of the de-energise phase.

Optionally, the power management apparatus comprises a second energy harvesting input channel for connecting to a second electrical energy harvesting source; and
the method comprises operating the switching circuit to transfer energy between each of the energy harvesting input channels and the first energy storage element output by a sequence of energy transfer cycles in a time-multiplexed manner.

Optionally, the power management apparatus comprises a load output, and the method comprises operating the switching circuit to transfer energy from the first energy storage element connection to the load output via the inductor connection.

Optionally, the method comprises, during operation:
determining if the first energy harvesting input channel is operating substantially at a maximum power point; and
if the first energy harvesting input channel is no longer operating substantially at a maximum power point, determining a new energise time (tE) and a new harvesting cycle period (tP) for the first energy harvesting input channel.

Another aspect provides a controller for a power management apparatus which is configured to perform the method as disclosed or claimed.

An aspect provides a computer program comprising instructions which, when the program is executed by a computer, cause the computer to carry out the method as disclosed or claimed. Another aspect provides a computer-readable medium having the computer program stored on it. The functionality described in this document can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

An advantage of at least one example of the present invention is that the power management apparatus can connect to a wider range of energy harvesting sources. At least the first input channel can connect to an energy harvesting source which outputs a DC electrical signal and an energy harvesting source which outputs an AC electrical signal. This can reduce the overall number of physical input channels required on the apparatus.

An advantage of at least one example of the present invention is that the power management apparatus is easier to install. For example, an installer does not need to connect particular types of energy harvesting source to particular input channels (e.g. DC-only input channels or AC-only input channels). In at least one example, an installer does not need to connect output terminals of an energy harvesting source to input terminals of the power management apparatus with a particular polarity.

An advantage of at least one example of the present invention is that the power management apparatus can modify its operation based on the type of electrical signal received at the input channel. This can improve the amount of harvested energy.

DETAILED DESCRIPTION

Figure 1:
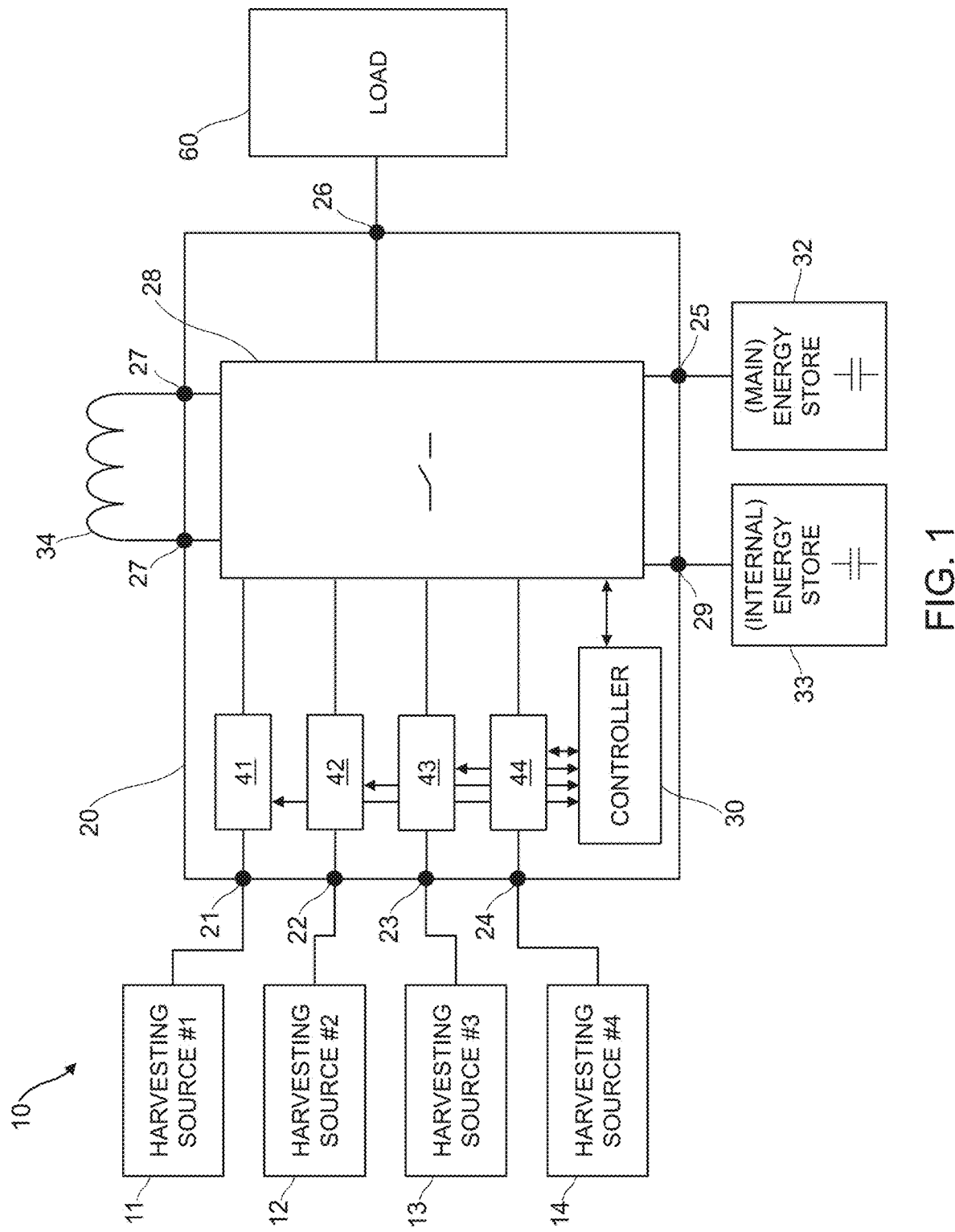
FIG. 1 shows an energy harvesting system including a power management apparatus.

FIG. 1 shows an energy harvesting system 10 comprising a power management apparatus 20. Other names for the power management apparatus are a power management unit (PMU) or a power management integrated circuit (PMIC). The power management apparatus 20 has a plurality of energy harvesting inputs or energy harvesting input channels 21-24. In this example there are four input channels but the number of input channels can be any suitable number. Each of the input channels 21-24 can connect to an energy harvesting source or an energy harvesting transducer 11-14. Examples of energy harvesting sources are: a photovoltaic (PV) cell which generates an electrical output in response to light; a thermoelectric generator (TEG) which generates an electrical output in response to a temperature difference; a piezoelectric transducer which generates an electrical output in response to mechanical strain across the transducer; and an electrodynamic transducer which generates an electrical output in response to vibrations.

The input channels 21-24 may connect to different types of energy harvesting sources. One of the input channels 21-24 may connect to a type of energy harvesting source which is different to a type of energy harvesting source connected to another one of the input channels 21-24. For example, the input channels 21-24 may be connected to: (i) four PV sources; (ii) two PV sources and two TEG sources; (iii) one PV source, one TEG source and one piezo source. Each input channel 21-24 may receive electrical energy with a current in the range, for example, of 1 µA to 100 mA and a voltage in the range 20 mV to 20 V. An impedance of the energy harvesting source 11-14 may be in the range, for example, from single-digit ohms to tens of thousands of ohms. At least one of the input channels 21-24 is capable of receiving a direct current (DC) signal and an alternating current (AC) signal. Advantageously, and in the following description, each of the input channels 21-24 is capable of receiving a direct current (DC) signal and an alternating current (AC) signal. The power management apparatus 20 detects whether the input signal is a DC signal or an AC signal.

The power management apparatus 20 comprises an output 25 for connecting to an energy store 32. This will be called a main energy store as it is the main store of energy which is used to power a load and internal circuitry. The main energy store 32 may be provided on a same printed circuit board as the power management apparatus 20, or may be separate to the power management apparatus. Examples of devices suitable for use as the main energy store are: a capacitor, a super capacitor, a battery. The power management apparatus 20 may connect to a plurality of main energy stores. These may be of the same type, or different types (e.g. super-capacitor and battery).

Optionally, the power management apparatus 20 comprises an output 29 for connecting to another energy store 33. This further energy store 33 will be called an internal energy store as the function is to store energy to power operation of the power management apparatus. The internal energy store 33 will typically be provided on a same printed circuit board as the power management apparatus 20. Examples of devices suitable for use as the internal energy store are: a capacitor, a super capacitor, a battery.

The power management apparatus 20 has an output 26 for connecting to a load 60. The load 60 can be any device requiring an electrical supply. There is a capacitor (not shown) between the output 26 and the load. Example loads are wireless devices which perform a sensing function (e.g. temperature sensing) and wirelessly report a measurement; Internet of Things (IoT) devices; home automation devices; asset tracking devices.

The power management apparatus 20 comprises an inductor connection 27 for connecting to an inductor 34. The inductor connection may comprise a pair of terminals or other electrical connection for electrically connecting to first and second ends of the inductor 34. The inductor 34 comprises a magnetic core and a coil. The power management apparatus 20 comprises a switching circuit 28 which can selectively connect the inputs 21-24 to the inductor 34. The switching circuit 28 can also selectively connect the inductor 34 to the energy store 32 via the output 25 and to the energy store 33 via the output 29. The switching circuit 28 can also selectively connect the inductor 34 to a load 60 via the output 26. A controller 30 controls operation of the switching circuit 28. A plurality of loads 60 may be connected to the load output 26.

The power management apparatus 20 comprises a plurality of input stages 41-44. Each of the input stages 41-44 connects to a respective input channel 21-24. Each of the input channels 21-24 is capable of receiving a direct current (DC) signal and an alternating current (AC) signal. One of these types of signal will be received at a particular time. At a particular time, each of the input channels 21-24: (i) receives a direct current (DC) signal; (ii) receives an alternating current (AC) signal; or (iii) does not receive any signal because the input channel is not connected to a source, or because the source is not active. The input stages 41-44 in cooperation with the controller 30 determine whether an input signal received at a particular time is a DC signal or an AC signal. In the case of an AC signal, the input stages 41-44 convert negative polarity portions of an AC signal to positive polarity (i.e. negative polarity AC half cycles are converted to positive polarity half cycles). The converted AC signal only has positive polarity half cycles. This has the effect of rectifying the input AC signal. Each of the input channels 21-24 has two input terminals. The input stages 41-44 provide a ground reference and clamp one of the input terminals to ground. The controller 30 determines operating parameters (energise time (tE) and harvesting cycle period (tP)) for the switching circuit 28 based on whether the input signal is DC or AC. In the case of a DC signal, or a quasi-DC signal, a positive polarity line may connect to either of the terminals of the input channels 21-24. The input stages 41-44 determine the relative polarity of the input lines and connect one of the input lines to the output and the other of the input lines to ground. This is particularly useful with quasi-DC sources such as TEG sources, where the relative polarity of the output depends on the thermal gradient.

Figure 2:
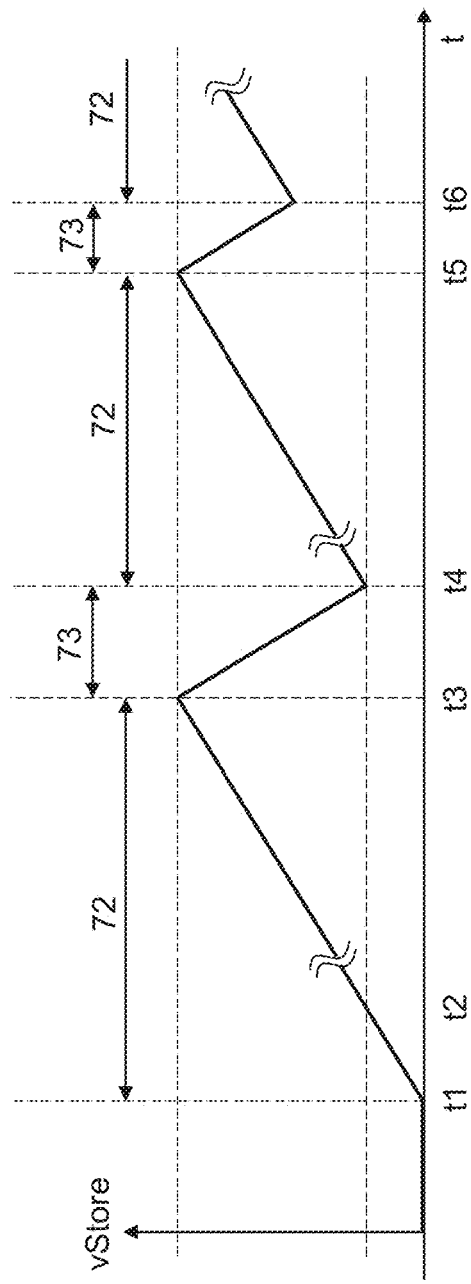
FIG. 2 shows an example time line of operating the power management apparatus.

FIG. 2 shows an example time line of operating the power management apparatus 20. In this example, the time line comprises periods 73 when the power management apparatus transfers energy to a load and periods 72 when the power management apparatus does not transfer energy to the load (i.e. only harvests energy). At time t1 the first period 72 begins. Between times t1 and t3 the power management apparatus 20 harvests energy by transferring electrical energy received via inputs 21-24 to the main energy store 32.

The power management apparatus does not power the load during this time. The power management apparatus may also transfer electrical energy between the main energy store 32 and the internal energy store 33. At time t3 the energy store 32 is full. Between times t3 and t4 the power management apparatus 20 transfers electrical energy from the main energy store 32 to the output 26 for powering the load 60. The voltage vStore falls as the energy store empties. The power management apparatus operates as a DC-to-DC converter, converting electrical energy from the main energy store to an output voltage required by the load 60. During period 73 the power management apparatus may also transfer electrical energy received via inputs 21-24 to the main energy store 32, similar to period 72. During period 73, the power management apparatus may also transfer electrical energy between the main energy store 32 and the internal energy store 33. During each of the periods 73 the power management apparatus may service the various demands on inductor time (powering the load, transfer main store-to-internal store, input channel-to-main store) on a priority basis.

At time t4 the voltage level of vStore reaches a predefined threshold and the power management apparatus stops powering the load. Between times t4 and t5 the power management apparatus 20 operates in another period 72 in which it harvests energy and does not power the load. At time t5 the power management apparatus 20 begins another period 73 in which it powers the load. On this occasion, period 73 ends at time t6 after a shorter duration (compared to time t3 to t4) and the voltage vStore has not fallen to the threshold value. At time t6 the power management apparatus 20 begins another period in which it harvests energy and does not power the load. In general, periods 73 can last for a varying length of time. The length of time can depend on power demands of the load. The voltage vStore at the end of the load powering mode can fall within a range of values.

During an initial period between t1 and t2 the power management apparatus 20 can transfer electrical energy received via inputs 21-24 to the internal energy store 31 and the main energy store 32 to ensure that the internal energy store is adequately charged.

The energy harvesting sources 21-24 connected to the inputs 21-24 can be of the same type, or different types. For energy harvesting sources of different types, the voltage and current can differ between the energy harvesting source types. The electrical signal can be direct current (DC) or alternating current (AC). A piezoelectric transducer is an example of an energy harvesting source which produces an AC output. A further variable is that the energy contributed by each of the energy harvesting sources can vary over time.

The power management apparatus operates in a time-multiplexed manner, connecting to one of the input channels at a time. The inductor 34 is a resource which is shared between the input channels 21-24. The inductor 34 can only be connected to one of the input channels 21-24 at a time.

The controller 30 operates the power management apparatus 20 so as to maximise an amount of energy harvested from the inputs 21-24.

Figure 3:
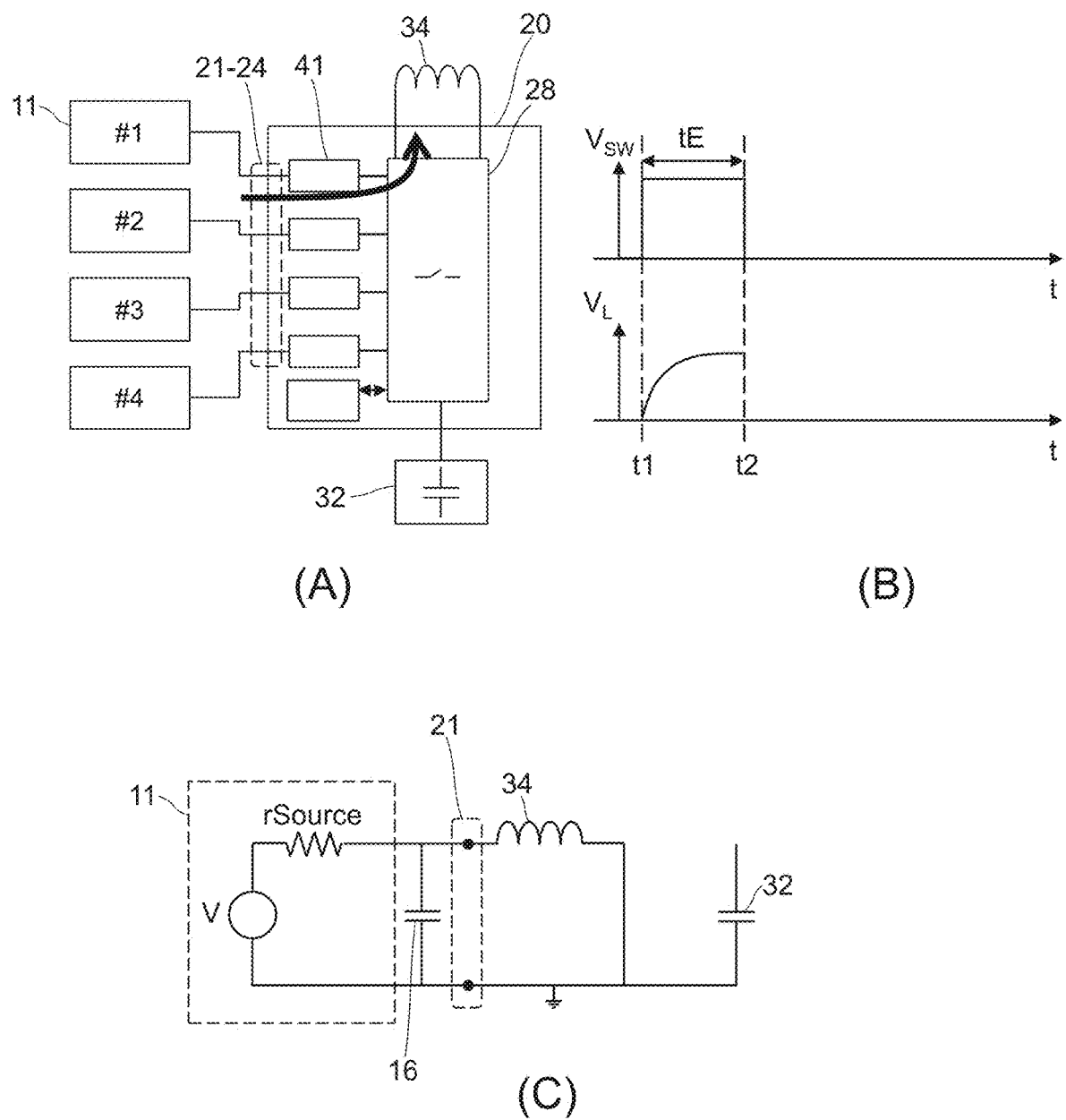
FIG. 3 shows operation of the power management apparatus during an energise phase of one harvesting cycle.
Figure 4:
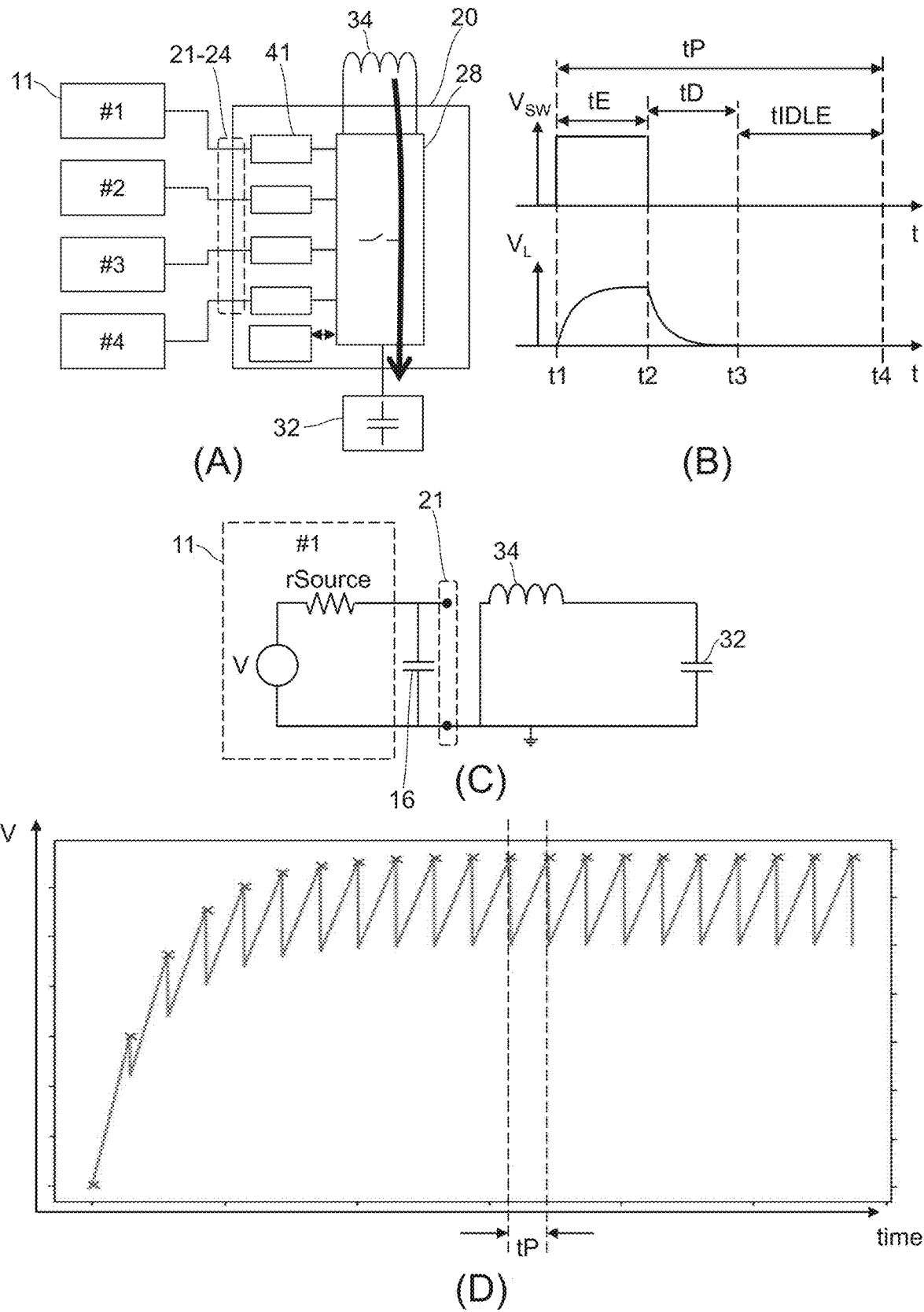
FIG. 4 shows operation of the power management apparatus during a de-energise phase of one harvesting cycle.

FIGS. 3 and 4 show operation of the power management apparatus to transfer energy between one of the input channels 21-24 and the main energy store 32. The power management apparatus is operated in discontinuous conduction mode (DCM). One harvesting cycle for an input channel comprises an energise phase (FIG. 3) and a de-energise phase (FIG. 4). The energise phase transfers electrical energy from the input channel to a magnetic field of the inductor 34. The de-energise phase transfers energy from the magnetic field of the inductor 34 to the energy store 32. This example shows a harvesting cycle for an energy harvesting source 11 connected to input channel #1. A similar process applies to each of the other input channels. Another name for the combination of the energise phase and the de-energise phase is a commutation.

Starting with FIG. 3, the energise phase begins at time t1. The switching circuit 28 connects one of the input channels 21-24 to the inductor 34. The switching circuit 28 comprises one or more switches which are turned on to form a current path through the inductor 34. The switches are turned on for a period tE. During the period tE, a current flows through the inductor 34 and a voltage $V_L$ increases across the inductor, eventually stabilising at a constant value. At time t2 the energise phase ends. Energy which has been transferred to the inductor is now stored in a magnetic field of the inductor 34. The switches are typically turned on continuously for the duration tE. FIG. 3(C) shows an equivalent schematic circuit during the energise phase. The energy harvesting source 11 is connected to the inductor 34 via the input channel 21 and an input capacitor 16.

Moving on to FIG. 4, the de-energise phase begins at time t2. The switching circuit 28 connects the inductor 34 to the energy store 32. Energy is released from the magnetic field of the inductor 34. A current flows to the energy store 32. A voltage $V_L$ across the inductor decreases and a voltage vStore (not shown) of the energy store 32 increases. At time t3, after a period tD, the voltage $V_L$ across the inductor 34 decreases to zero. Energy has been transferred from the magnetic field of the inductor 34 to the energy store 32.

One harvesting cycle for the input channel #1 has a total duration (period) of tP. There is an idle phase (tIDLE) between times t3 and t4. During this time, the input channel #1 is not connected to the inductor 34. At time t4, after the period tP, a new harvesting cycle can begin. During the idle phase, the inductor 34 is not used by input channel #1. However, it can be used by another one of the input channels #2, #3 or #4, or for another function, such as transferring energy between the main energy store 32 and the internal energy store 33.

The equivalent schematic circuit of FIG. 4(C) applies during the de-energise phase. The inductor 34 is connected to the energy store 32. During this time the energy harvesting source 11 remains connected to the input capacitor 16 and the input channel 21. However, the input channel 21 is not connected to the inductor 34. A period tIDLE occurs between the end of the de-energise period tD and until the start of the next energise period tE. During tIDLE the energy harvesting source 11 remains connected to the input capacitor 16 and the input channel 21. The input channel 21 is not connected to the inductor 34. The inductor 34 is not connected to the energy store 32. The input capacitor 16 functions as an energy storage buffer, re-charging during the periods when it is not connected to the inductor 34. FIG. 4(D) shows voltage on input capacitor 16 over time. After a settling period, the voltage has a generally sawtooth profile. During the energise phase voltage on the input capacitor 16 falls as energy is transferred to the inductor 34. Between energise phases, voltage on the input capacitor 16 rises as energy is transferred from the energy harvesting source 11 to the input capacitor 16.

The two main operating parameters for controlling operation of the switching circuit 28 to transfer energy from an input channel are: tE (energise time) and tP (harvesting cycle period). These parameters cause the power management apparatus 20 to present an impedance to one of the harvesting sources 11-14 connected to the power management apparatus 20. An optimum transfer of energy (power) from a harvesting source to the power management apparatus occurs at a maximum power point (MPP). For a Thevenin source, this is a point where the resistance/impedance of the source 11 is equal to the resistance/impedance of the power management apparatus 20. There are multiple combinations of tE and tP which cause the power management apparatus to operate at the MPP. The harvesting cycle period tP of one of the input channels 21-24 can be different to the harvesting cycle period tP of another one of the input channels 21-24, or can be different to the harvesting cycle period tP of each of the other input channels 21-24.

In operation, the power management apparatus can only service one input channel at a time. That is, the inductor 28 can only be used to transfer energy from one of the input channels to the energy store 34 at a time. From FIGS. 3 and 4, it can be seen that a harvesting cycle for one of the input channels 21-24 requires an amount of inductor time tE+tD. It is useful to define a metric called utilisation which indicates the amount of inductor time used by an input channel. Utilisation, or utilisation factor is defined as:

$$\text{Utilisation} = \frac{tE + tD}{tP} \quad (1)$$

where: tE=energise time; tD=de-energise time; tP=period of the harvesting cycle.

In the example shown in FIG. 4, the utilisation is around 0.5 or 50%. That is, the input channel #1 requires the inductor for 50% of the total available inductor time.

Figure 5:
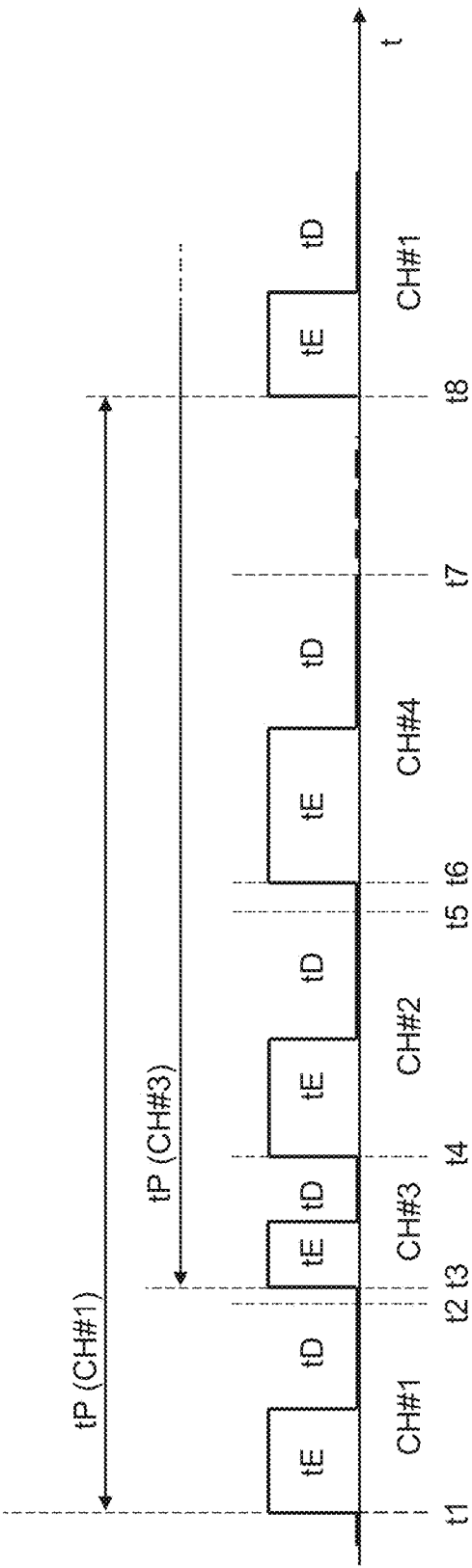
FIG. 5 shows an example of operating the power management apparatus to harvest energy from a plurality of input channels.

FIG. 5 shows an example time line of operating the power management apparatus to transfer energy between a plurality of input channels 21-24 and the main energy store 32. At time t1 the switching circuit connects input channel #1 to the inductor. There is an energise phase tE and a de-energise phase tD. The CH #1 use of the inductor ends at time t2. There is a short period of idle time between times t2 and t3. At time t3 the switching circuit connects input channel #3 to the inductor. Input channels #2 and #4 are serviced in a similar way. There is a short period of idle time between times t7 and t8. At time t8 a period tP has elapsed since the start of tE for input channel #1. This is the harvesting cycle period for input channel #1. At time t8 the switching circuit connects input channel #1 to the inductor. It can be seen that the switching circuit does not operate with a rigidly defined sequence of fixed slots. Instead, requests for connecting to the inductor are serviced on demand. The controller can service requests for connection to the inductor based on priority. For example, the controller may prioritise store-to-load transfers over input-to-store transfers. This allows efficient use of the inductor time, and allows the inductor to be used for other operations. One example of another function is transferring energy between the main energy store 32 and the internal energy store 33. Similar to energy transfer described above, an energy transfer between the main energy store 32 and the internal energy store 33 comprises an energise phase during which energy is transferred to the magnetic field of the inductor and a de-energise phase during which energy is released from the magnetic field of the inductor to the internal energy store. In this example time line there are some idle periods between active periods when the inductor is used to transfer energy. In other examples, the idle periods may be absent and the inductor is fully utilised.

Figure 6:
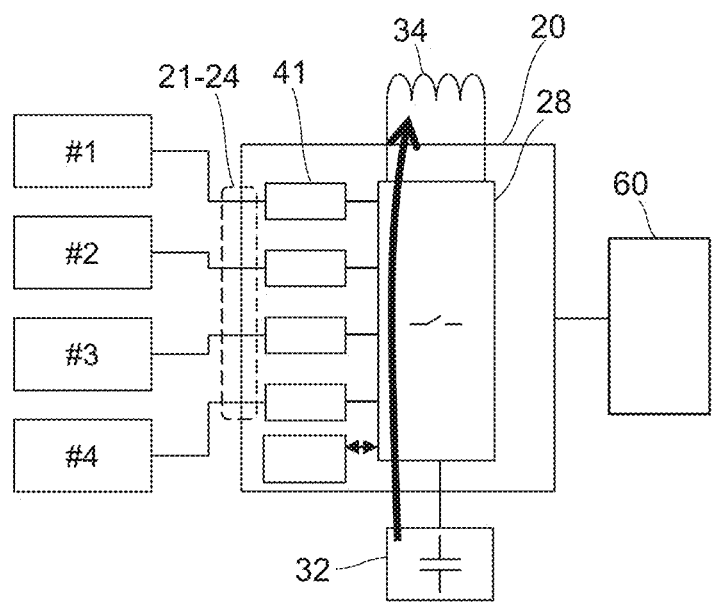
FIG. 6 shows operation of the power management apparatus during an energise phase of transferring energy to a load.
Figure 7:
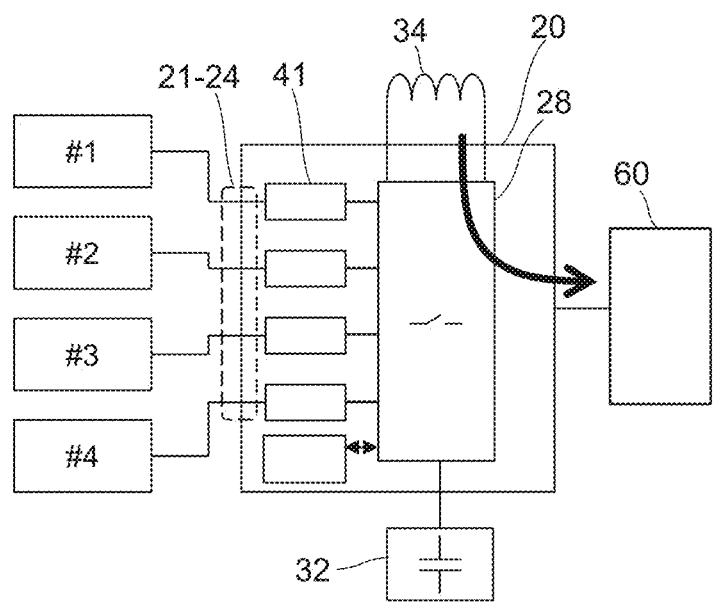
FIG. 7 shows operation of the power management apparatus during a de-energise phase of transferring energy to a load.

FIGS. 6 and 7 show operation of the power management apparatus to transfer energy between the main energy store 32 and the load 60. This is similar to operation shown in FIGS. 3 and 4, except that energy is transferred from the main energy store 32 to the load 60.

One transfer cycle comprises an energise phase (FIG. 6) and a de-energise phase (FIG. 7). The energise phase transfers electrical energy from the energy store 32 to a magnetic field of the inductor 34. The de-energise phase transfers energy from the magnetic field of the inductor 34 to the load 60.

Figure 8:
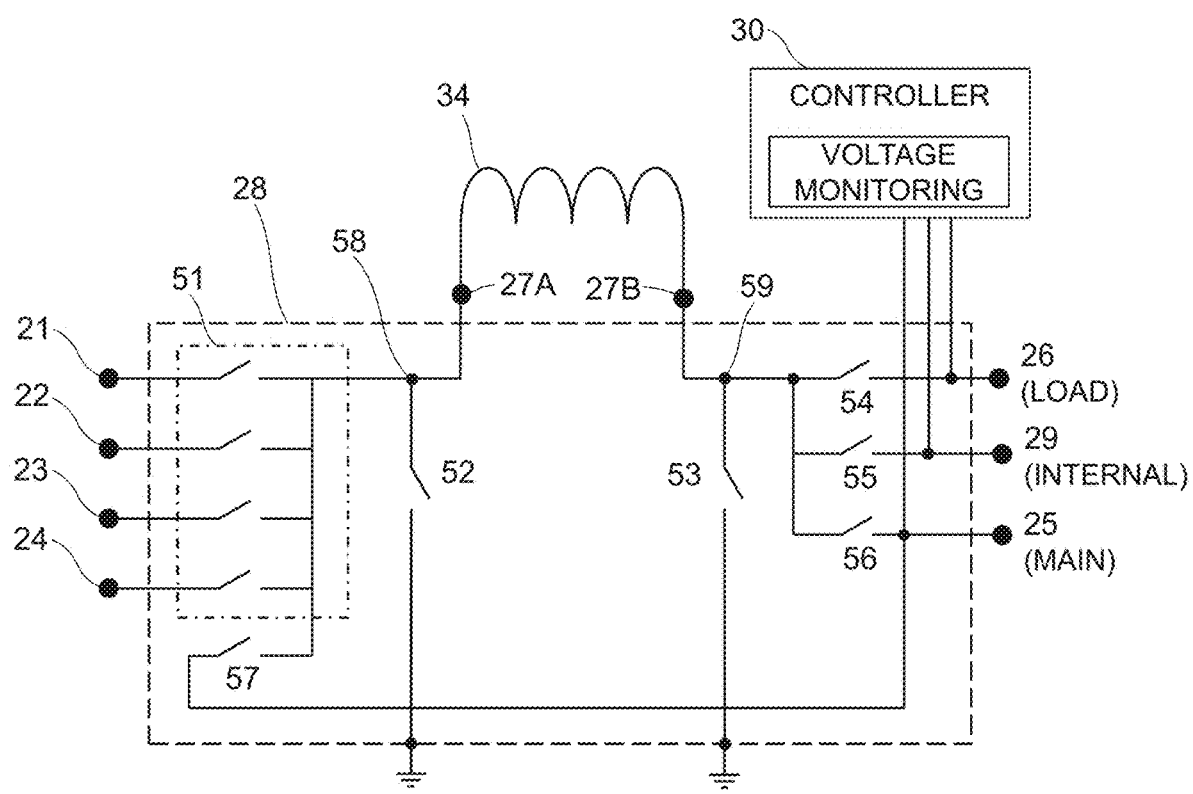
FIG. 8 shows an example of the switching circuit of the power management apparatus.

FIG. 8 shows an example of the switching circuit 28 in the power management apparatus 20. This is one possible implementation. The general topology is of a buck-boost DC-to-DC converter. A set of switches 51 connect the input channels 21-24 to node 58 at a first side of the inductor 34. The input stages 41-44 in the paths between the input channels 21-24 and the switching circuit 28 are omitted from this drawing for clarity. A switch 52 connects between node 58 and ground at a first side of the inductor 34. A switch 53 connects between node 59 and ground at a second side of the inductor 34. A switch 56 connects between node 59 and the main energy store terminal 25. A switch 55 connects between node 59 and the internal energy store terminal 29. A switch 54 connects between node 59 and the load output terminal 26. A switch 57 connects between the main energy store terminal 25 and node 58. In the energise phase of a transfer between an input channel and the main energy store 32 (FIG. 3), one of the switches in set 51 is closed and switch 53 is closed. This forms a current path through the inductor 34. In the de-energise phase of a transfer between an input channel and the main energy store 32 (FIG. 4), switch 52 is closed, switch 56 is closed and switch 53 is open. This forms a current path from the inductor 34 to the energy store 32. In the energise phase of a transfer between the main energy store 32 and the load 60 (FIG. 5), switch 57 is closed, switch 53 is closed and switch 52 is open. This forms a current path from the energy store 32 through the inductor 34. In the de-energise phase of a transfer between the main energy store 32 and the load 60 (FIG. 6), switch 52 is closed, switch 54 is closed and switch 53 is open. This forms a current path from the inductor 34 to the load. In the energise phase of a main energy store to internal energy store transfer, switch 57 is closed, switch 53 is closed and switch 52 is open. This forms a current path from the main energy store through the inductor 34. In the de-energise phase of the of the main energy store to internal energy store transfer, switch 52 is closed, switch 55 is closed and switch 53 is open. This forms a current path from the inductor 34 to the internal energy store 33. Each of the switches 51-57 can be an electronic switch, such as a field-effect transistor (FET), or any other switching device. Each of the switches 51-57 is controlled by the controller 30.

The controller 30 operates the switching circuit 28. The controller 30 operates the switching circuit 28 to first transfer from any source to the main energy store 32 and then from the main energy store 32 to the internal energy store 33 or to the load. The power management apparatus may operate as a DC-to-DC boost converter or a DC-to-DC buck converter depending on the respective voltages on the input and output sides. For example, the power management apparatus may operate as a DC-to-DC buck converter if the required output voltage is lower than a voltage of the main energy store.

DC & AC Signals

Figure 9:
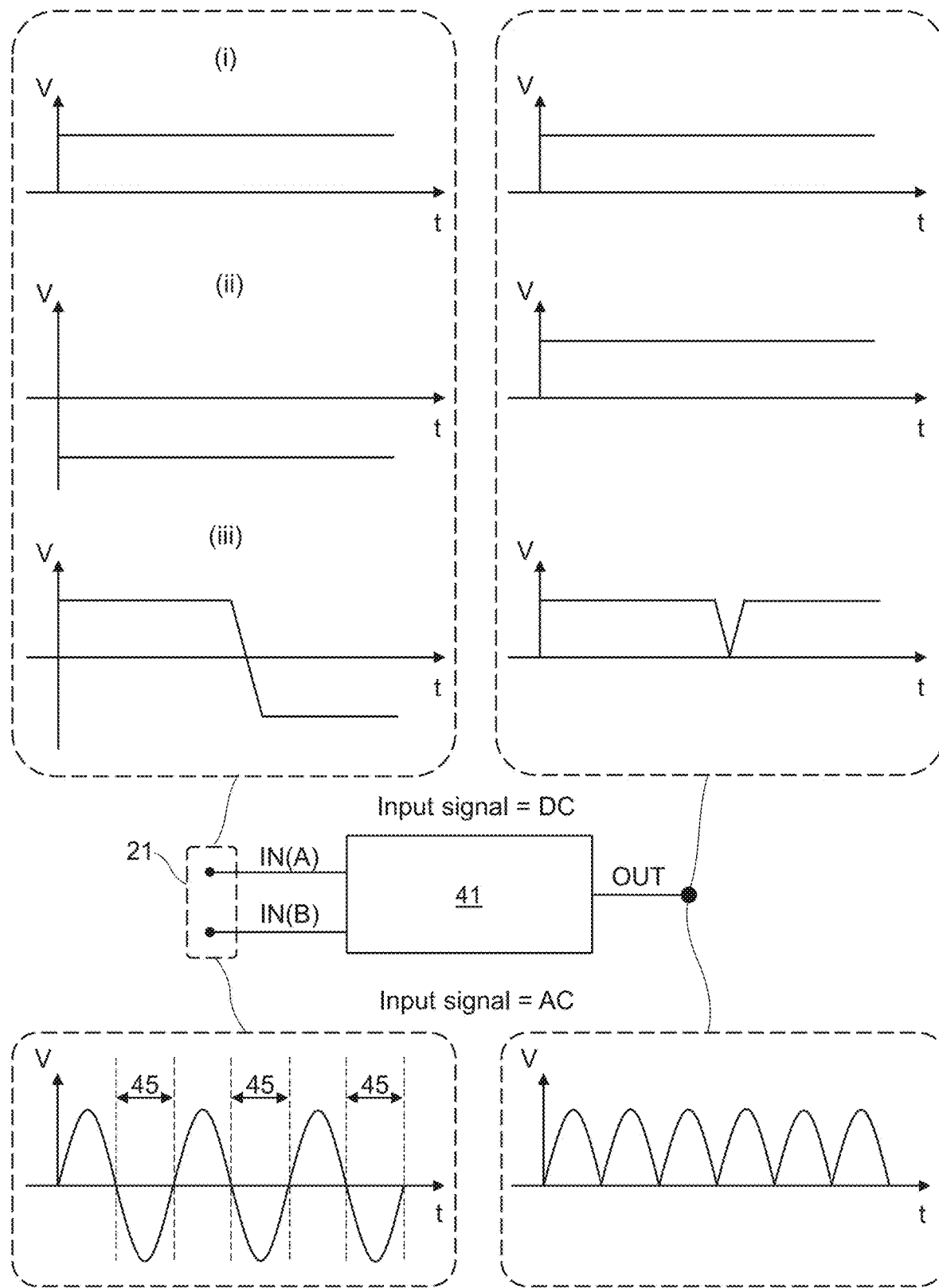
FIG. 9 shows an overview of an input stage of the power management apparatus with DC and AC input signals.

FIG. 9 shows an overview of operation of one of the input stages 41-44. Input channel 21 has a pair of input lines IN(A), IN(B). The input signal can be a DC signal, a quasi-DC signal, or an AC signal. The top drawings show the case of a DC signal and a quasi-DC signal. Example (i) is a DC signal with a positive polarity line connected to IN(A). The input signal always has a positive voltage. The input stage 41 passes the DC input signal to the output OUT. Example (ii) is a DC signal with a positive polarity line connected to IN(B). The input stage 41 connects IN(B) to OUT to output a signal with positive polarity. The input stage 41 connects IN(A) to ground. While these drawings show a DC signal with a constant voltage, it will be understood that the DC signal may vary in voltage over a period of time. Example (iii) is a quasi-DC or bipolar DC signal. The input signal has a positive polarity (IN(A)>IN (B)) for a first period of time, and then reverses polarity (IN(B)>IN(A)) for a second period of time. The input stage 41 passes the DC input signal to the output OUT such that the output signal always has a positive polarity.

The lower drawings show the case of an AC signal. The input signal is AC, i.e. the signal has a waveform which alternates between a period with positive voltage values (and current flow in a first direction) and a period with negative voltage values (and current flow in a second, opposite, direction). The input stage 41 converts the AC input signal such that the portions 45 of the AC signal with negative voltages are converted to positive voltages. This can be considered as a form of rectification although, as explained below, the input stage does not use diodes to convert the negative voltages. The output signal only has positive voltage values. The negative voltage half cycles 45 have been converted to positive voltage half cycles.

In these drawings, the time scales of the quasi-DC signal and the AC signal are not intended to be the same. A quasi-DC signal typically remains in one polarity state ((IN(A)>IN(B), IN(B)>IN(A)) for a much longer time than an AC signal.

Figure 10:
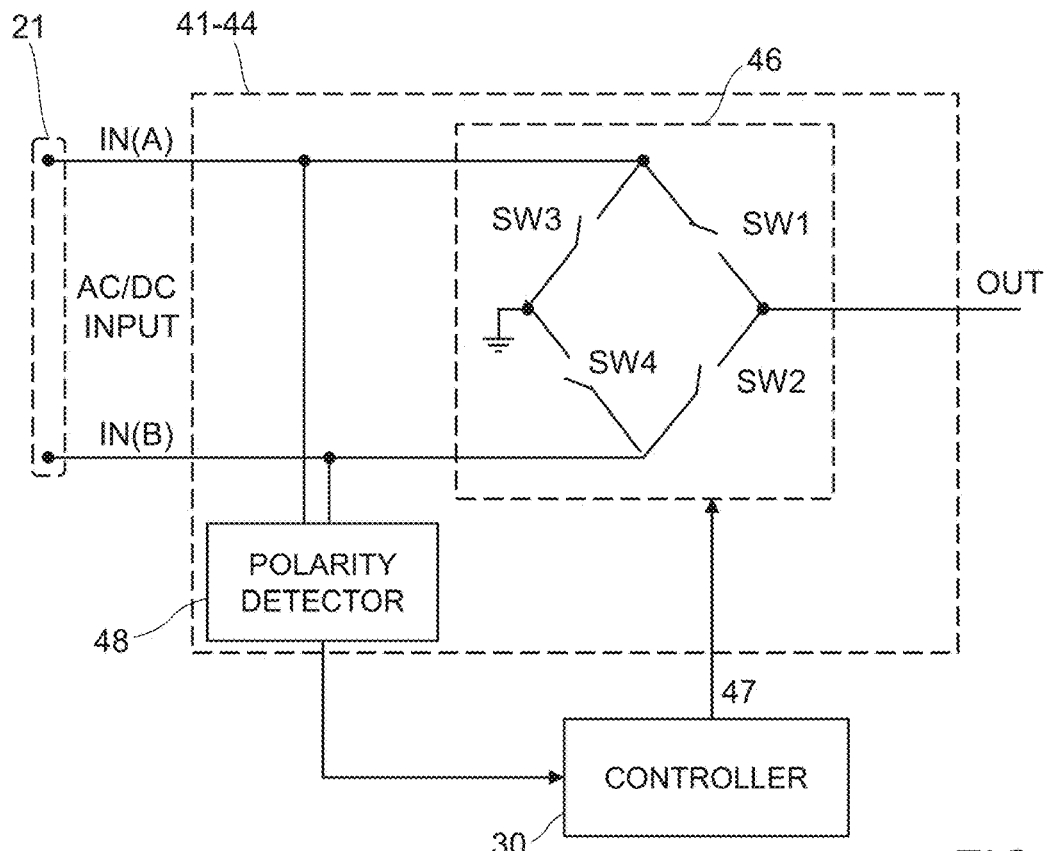
FIG. 10 shows an input stage of the power management apparatus.

FIG. 10 shows an example of one of the input stages 41-44. The input channel 21 has two input lines IN(A) and IN(B) which connect to input stage 41. The input lines IN(A), IN(B) are connected to a plurality of switches SW1-SW4 configured as a bridge 46. A first branch connects the input line IN(A) to the input line IN(B). The first branch comprises the switches SW1 and SW2 connected in series. A second branch connects the input line IN(A) to the input line IN(B). The second branch comprises the switches SW3 and SW4 connected in series. An output line OUT is connected to a mid-point of the first branch. The mid-point of the second branch is connected to ground. The switches SW1-SW4 are controlled 47 by the controller 30. A polarity detector 48 is connected to the input lines IN(A) and IN(B). The polarity detector 48 provides an output to the controller 30 indicative of the polarity of the input signal. In one example, the polarity detector 48 compares the signal on line IN(A) with the signal on line IN(B). For positive portions of an AC signal, there is a positive voltage difference between lines IN(A) and IN(B), i.e. IN(A)>IN(B). For negative portions of an AC signal, there is a negative voltage difference between lines IN(A) and IN(B), i.e. IN(A)<IN(B). The polarity detector 48 can operate continuously, or substantially continuously, by comparing analog signals on IN(A) and IN(B). Alternatively, the polarity detector 48 can operate on digital samples of the signals on IN(A) and IN(B).

The controller can determine (to within a suitable level of accuracy) the zero-crossing point of the AC signal. When the polarity detector 48 indicates a change in polarity, this indicates that a zero-crossing has occurred for the AC input signal. The controller can determine the half cycle period of the AC signal from the time between two consecutive zero-crossing points. The controller can also determine the period and the frequency of the AC signal from the zero-crossing points. The controller may use information about the time of the zero-crossing points to decide whether or not to perform a particular one of the energy harvesting cycles. This is because there is minimal energy in an input AC signal in the region of the zero-crossing points.

A source with a DC signal may connect to input channel 21 with: (i) the positive polarity on line IN(A), or (ii) the positive polarity on line IN(B). The polarity detector 48 detects which line (IN(A) or IN(B)) has positive polarity and the controller 30 connects the other line to ground. For a DC signal input, the polarity (once detected) remains the same. For a quasi-DC or bipolar DC signal, the polarity can change over a period of time. For example, a TEG source may output a DC electrical signal with a first polarity during a first part of a day and then output a DC electrical signal with a second (reversed) polarity during a second part of a day. The controller 30 can distinguish between a DC input signal and an AC input signal based on a number of zero crossings detected by the polarity detector 48. The controller 30 can use a threshold value of time (between zero crossings) or a threshold AC signal frequency to distinguish between a quasi-DC input signal and an AC input signal. For example, a quasi-DC signal which changes polarity twice per day may be classified as a DC signal. The threshold can be set at other values.

Figure 11:
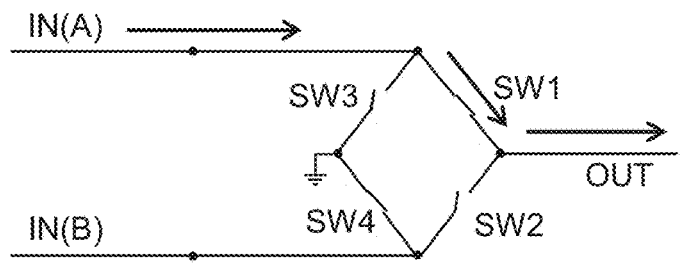
FIG. 11 shows operation of the input stage of the power management apparatus with DC and AC signals.
Figure 11:
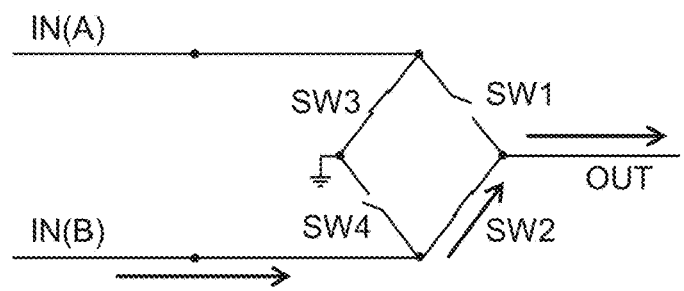

FIG. 11 shows operation of one of the input stages 41-44. The switches SW1-SW4 are operated in a first configuration and in a second configuration. In the first configuration switches SW1 and SW4 are closed. Switches SW2 and SW3 are open. Current flows along OUT. IN(B) is clamped to ground. In the second configuration switches SW2 and SW3 are closed. Switches SW1 and SW4 are open. Current flows along OUT. IN(A) is clamped to ground. The switches SW1-SW4 are operated in the first configuration during positive portions (half cycles) of an AC signal. The switches SW1-SW4 are operated in the second configuration during negative portions (half cycles) of an AC signal. The AC input signal is converted to a DC signal which is referenced to ground.

The input stages 41-44 also provide flexibility with connecting to energy harvesting sources outputting a DC signal, or a quasi-DC or bipolar DC signal. The switches SW1-SW4 are operated in the first configuration when input line IN(A) has positive polarity with respect to input line IN(B). Input line IN(A) is connected to OUT and input line IN(B) is connected to ground. The switches SW1-SW4 are operated in the second configuration when input line IN(B) has positive polarity with respect to input line IN(A). Input line IN(B) is connected to OUT and input line IN(A) is connected to ground. This allows the power management apparatus 20 to be used with DC and quasi-DC energy harvesting sources, such as TEG sources, which output a DC signal where the output line having positive polarity can vary based on the quantity being sensed.

The controller 30 determines an energise time (tE) and a harvesting cycle period (tP) for the switching circuit 28 based on whether the input signal is DC or AC. For an AC signal, it is advantageous to transfer energy from the input AC signal on a plurality of occasions during the period of an AC cycle. The controller 30 knows the period of the input AC signal from the detection described above. The harvesting cycle period tP can be set based on the period of the input AC signal. For example, the harvesting cycle period tP can be set as one sixteenth of the period of the input AC signal. Other values are possible.

Figure 12:
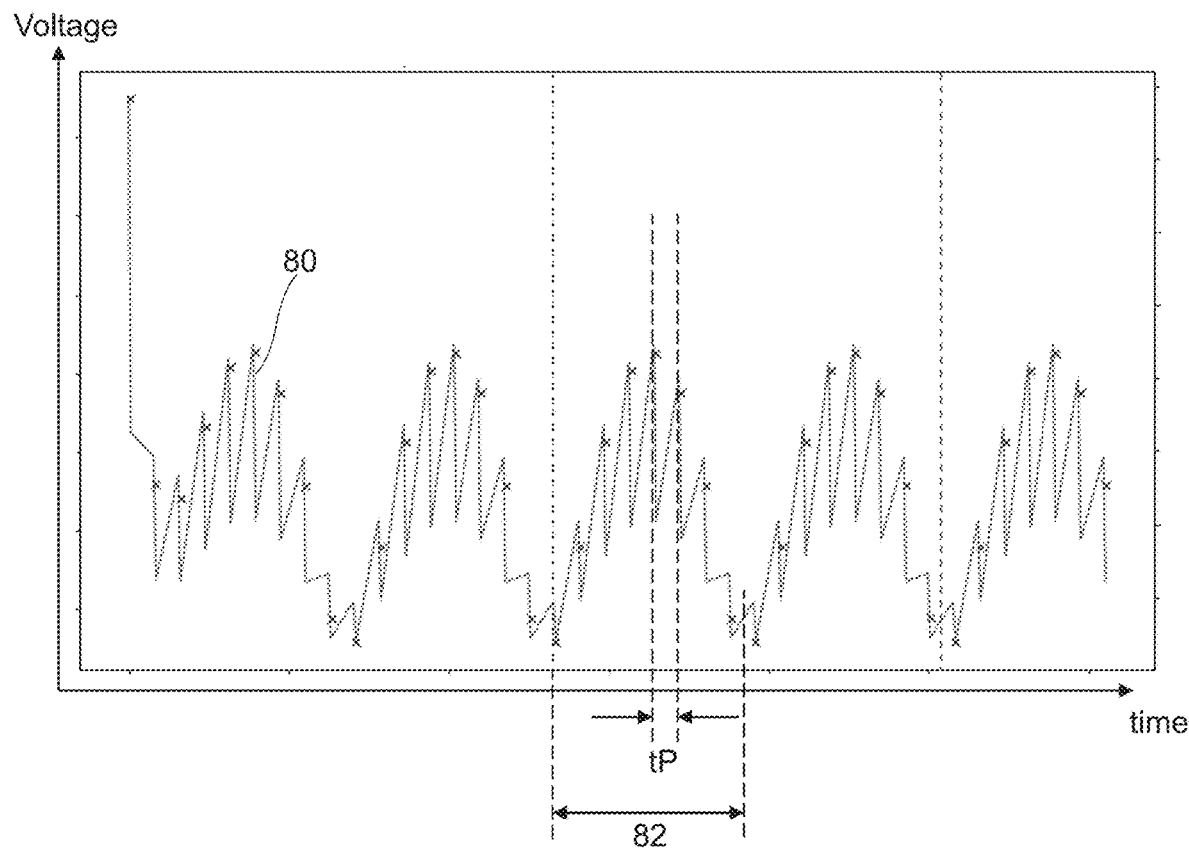
FIG. 12 shows a waveform at an input capacitor for an AC input signal.

FIG. 12 shows the effect of transferring energy in this way for an AC input signal. In this example, the controller 30 transfers energy on eight occasions during the half cycle of an AC input signal. The waveform 80 is the voltage on the input capacitor (16, FIGS. 3 and 4). The input capacitor can be part of the energy harvesting source 11 or can be connected between the energy harvesting source and the power management apparatus 20. For example, the input capacitor 16 can be provided on a PCB along with the power management apparatus 20.

Voltage on the input capacitor 16 falls when the switching circuit 28 turns on to transfer energy to the inductor 34. Voltage on the input capacitor 16 rises when the switching circuit 28 turns off. In this example, the AC input signal has a half cycle period 82 and the harvesting cycle period tP is one eighth of the half cycle period. That is, there are eight transfers of energy from the energy harvesting input channel during each half cycle of the AC input signal. The harvesting cycle period tP can be reduced to give more transfers during a half cycle period of the AC input signal, or increased to give fewer transfers during the half cycle period of the AC input signal. There is a trade-off between reducing the harvesting cycle period tP, which can potentially harvest more energy from the input source, and increasing the amount of time that this input source occupies the inductor (i.e. the inductor utilisation factor of equation (1)). An increased utilisation factor increases the amount of inductor time occupied by the input source, and therefore reduces the amount of inductor time available for other input sources.

For DC and AC signals, the controller determines operating parameters (tE, tP) for the switching circuit which transfer a maximum (or near maximum) amount of power from the energy harvesting source connected to the input channel. This is the maximum power point (MPP).

The MPP can be found in various ways. One example is a hill climbing algorithm. The aim of the hill climbing algorithm is to find a peak of a power curve, shown in FIG. 13. The controller selects a value of tE and tP and performs a series of harvesting cycles with an energise phase (of duration tE) and a harvesting cycle period tP. The system settles down to a steady state (consistent) operation after a series of harvesting cycles. When the steady state is achieved, the controller 30 monitors the subsequent de-energise time tD. The de-energise time tD can be monitored by monitoring a voltage between an output of the inductor (e.g. node 59 of the switching circuit shown in FIG. 8) and ground. For a given store capacitor voltage, the time taken for the voltage across the inductor 34 to return to zero (i.e. tD) is proportional to the de-energise current, which is indicative of power. Energy from an inductor is:

$$\text{energy} = \frac{1}{2}LI^2$$

where L is the inductance and I is the current, and the power from the inductor is:

$$\text{power} = \frac{\text{energy}}{\text{time}} = \frac{\text{energy}}{\text{period}}$$

The time taken for the voltage across the inductor 34 to return to zero is indicative of the energy/power that has been transferred from the source. By iteratively adjusting tE and/or tP, it is possible to test different combinations of tE and tP and monitor the effect on tD. If an adjustment in tE or tP (e.g. by increasing tE) increases measured power, then a further adjustment is made in the same direction (i.e. a further increase in tE). When an adjustment does not obtain an increase in measured power, then the algorithm determines that it has passed the peak of the power curve, and can select a parameter value which is between the last two values. By an iterative process, the algorithm can find the peak of the power curve. The measurements obtained are "pseudo-power" as they are indicative of power. They are not an actual measure of power because current is not measured. It is not necessary to measure the actual power. It is only necessary to find the peak point of the power curve by making pseudo-power measurements.

It will be understood that monitoring the time taken for the voltage across the inductor 34 to return to zero is one possible way of determining energy/power that has been transferred from the source. Another possible way is to measure the inductor voltage (at its peak). Another possible way is to provide a circuit which can directly measure inductor current.

Figure 13:
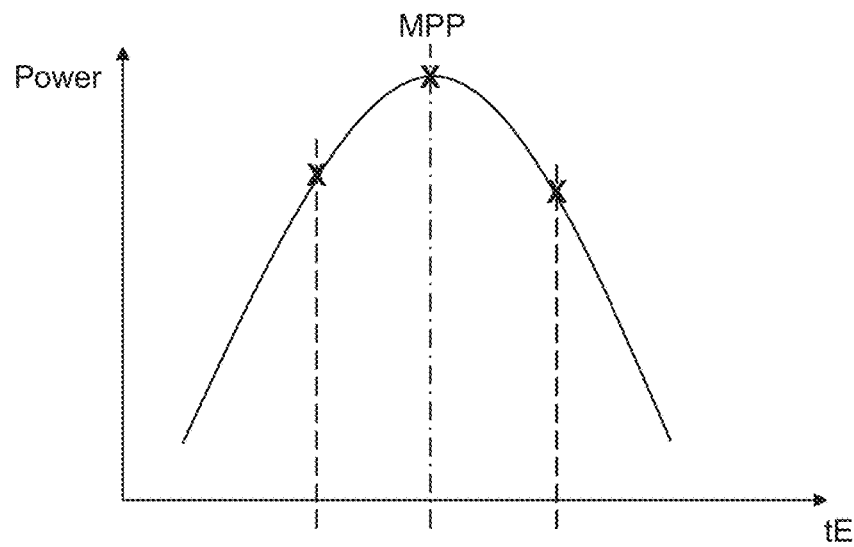
FIG. 13 shows a power curve for an AC input signal.

FIG. 13 shows an example of a power curve for transferring energy from an energy harvesting source. For an AC signal, the controller 30 selects a fixed value of the harvesting cycle period tP based on the period of the AC signal. The controller 30 finds a value of energise time tE which gives a maximum transfer of energy. This is the maximum power point MPP. As described above, the controller 30 tests different values of tE to find the MPP.

The power measurement technique described above measures power at a point in time of the input AC signal. Due to the time-varying nature of an AC signal, the value obtained by the power measurement will vary based on when, during an AC half cycle, the power measurement is performed.

Figure 14:
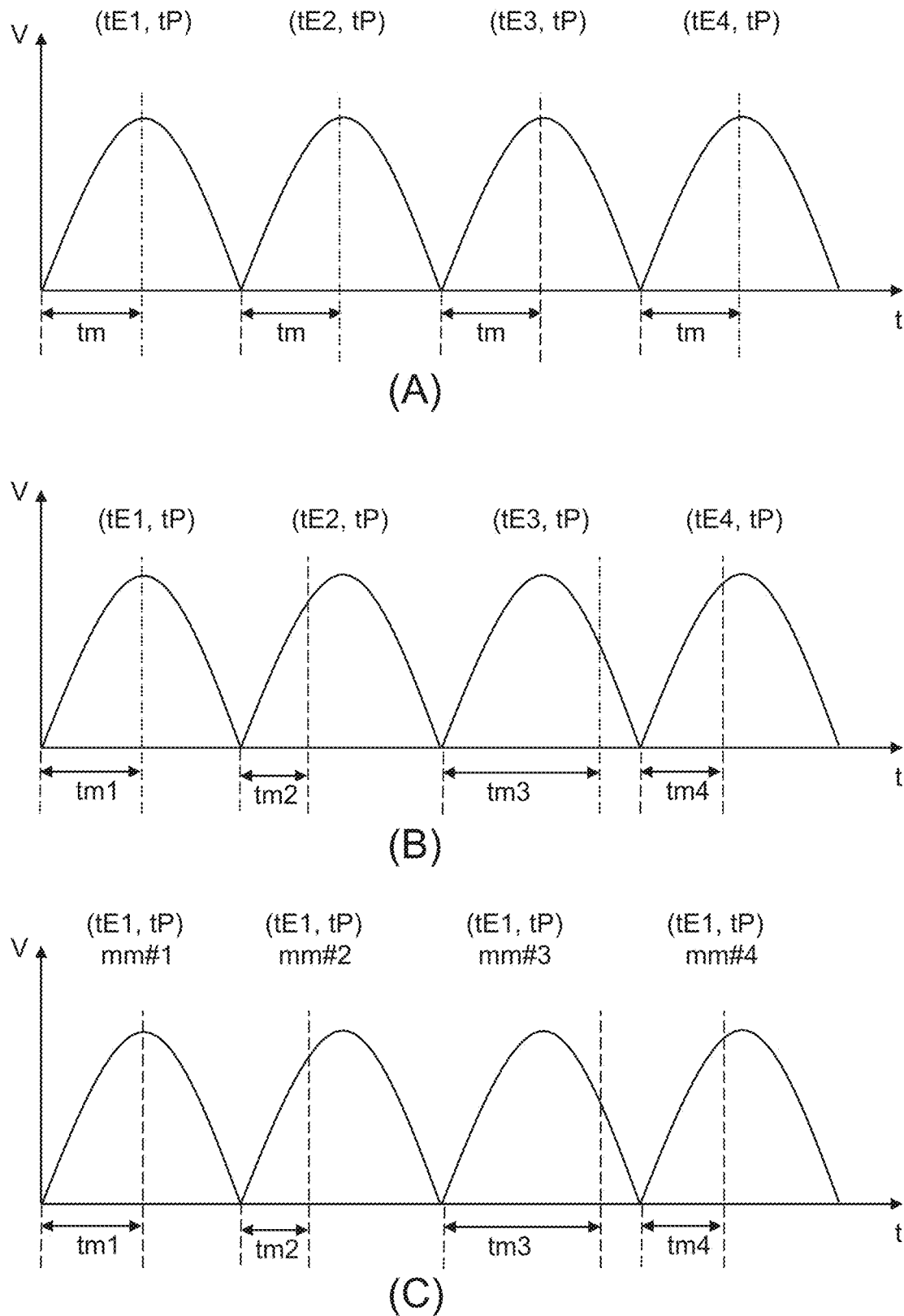
FIG. 14 shows some techniques for performing power measurements of an AC input signal.

FIG. 14 shows some possible ways of performing power measurements of AC signals for use in finding the MPP. In a first technique, shown in FIG. 14(A), the controller is configured to perform a power measurement at an offset time during the AC signal, where the offset time is synchronised with respect to the phase of the AC signal. Each power measurement is performed at the same offset time. A first power measurement is performed at an offset time tm after the start of a half cycle of the input AC signal. The controller uses values tE1, tP to transfer energy from the source. A second power measurement is performed at the same offset time tm after the start of a half cycle. The controller uses values tE2, tP to transfer energy from the source. Other power measurements are performed using values tE3, tP and tE4, tP at the same offset time tm. In this example each power measurement is performed during the peak region of the input AC signal. However, other offset time values can be used. Using the same offset time value provides consistency between the power measurements and allows a like-for-like comparison of the effects of different values of tE on the energy transfer. Using this technique, the controller has a set of comparative power measurements. This allows the controller to determine which values of tE and tP achieve maximum power transfer from the source. The polarity detector 48 indicates when zero-crossings of the AC signal occur and allows accurate timing of the offset.

A second technique is shown in FIG. 14(B). This is similar to the first technique, but the power measurements are performed at different offset times with respect to the start of a half cycle of the AC signal. A first power measurement is performed at an offset time tm1 after the start of a half cycle of the input AC signal. The controller uses values tE1, tP to transfer energy from the source. A second power measurement is performed at a different offset time tm2 after the start of a half cycle. The controller uses values tE2, tP to transfer energy from the source. Other power measurements are performed using values tE3, tP and tE4, tP at other offset times tm3, tm4. One or more of the power measurements may be compensated by a compensation factor based on the offset time. This adjusts the power measurement to compensate for the time at which the measurement was performed during the AC cycle. This allows a like-for-like comparison between the compensated power measurements of the effects of different values of tE on the energy transfer. This allows the controller to determine which values of tE and tP achieve maximum power transfer from the source. This example shows one power measurement per AC half cycle but the power measurements may be performed more frequently (e.g. a plurality of power measurements in the same AC half cycle) or less frequently.

A third technique is shown in FIG. 14(C). For each candidate value tE1, the controller performs a series of power measurements at different offset times with respect to the start of a half cycle of the AC signal. A first power measurement is performed at an offset time tm1 after the start of a half cycle of the input AC signal. The controller uses values tE1, tP to transfer energy from the source. A second power measurement is performed at a different offset time tm2 after the start of a half cycle. The controller again uses values tE1, tP to transfer energy from the source. Other power measurements are performed using values tE1, tP at other offset times. The controller determines an average of the series of power measurements to give an averaged power measurement at the values tE1, tP. The total number of power measurements in the series may be, for example, a number between 4 and 16. The averaging of a series of power measurements allows a like-for-like comparison between the set of power measurement using the parameters tE1, tP and a different set of power measurement using different parameters tE2, tP, and therefore the effect of different parameter values tE on the energy transfer. This allows the controller to determine which values of tE and tP achieve maximum power transfer from the source. This example shows one power measurement per AC half cycle but the power measurements may be performed more frequently (e.g. a plurality of power measurements in the same AC half cycle) or less frequently. While this technique requires a larger number of power measurements, there is flexibility as to when, during the AC cycle, the power measurements are made. Optionally, this technique may only perform the power measurements during a particular window of time around the peak of the AC cycle. The controller may not perform a power measurement (by performing a harvesting cycle with candidate values of tE and tP) at the zero-crossing point, or within a window of time around the zero-crossing point.

Figure 15:
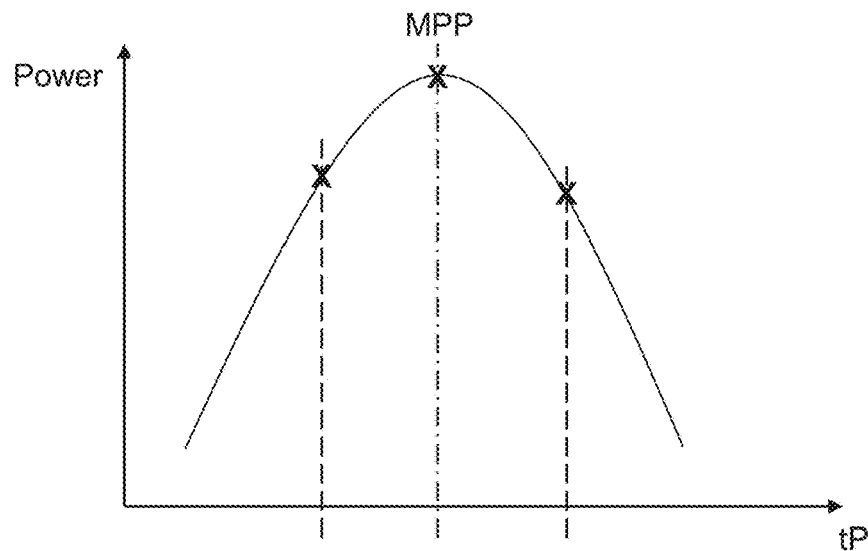
FIG. 15 shows a power curve for a DC input signal.

For a DC signal, it is more advantageous to select an optimum value of energise time tE and to find the value of harvesting cycle period tP which provides the MPP. Increasing tE reduces the utilisation factor (equation (1)) and therefore reduces the average amount of time that the inductor is used by the input channel. FIG. 15 shows an example of a power curve for transferring energy from an energy harvesting source. For a fixed value of the energise time tE, there is a value of harvesting cycle period tP which gives a maximum transfer of energy. This is the maximum power point MPP. As described above, the controller 30 tests different values of tP to find the MPP.

Figure 16:
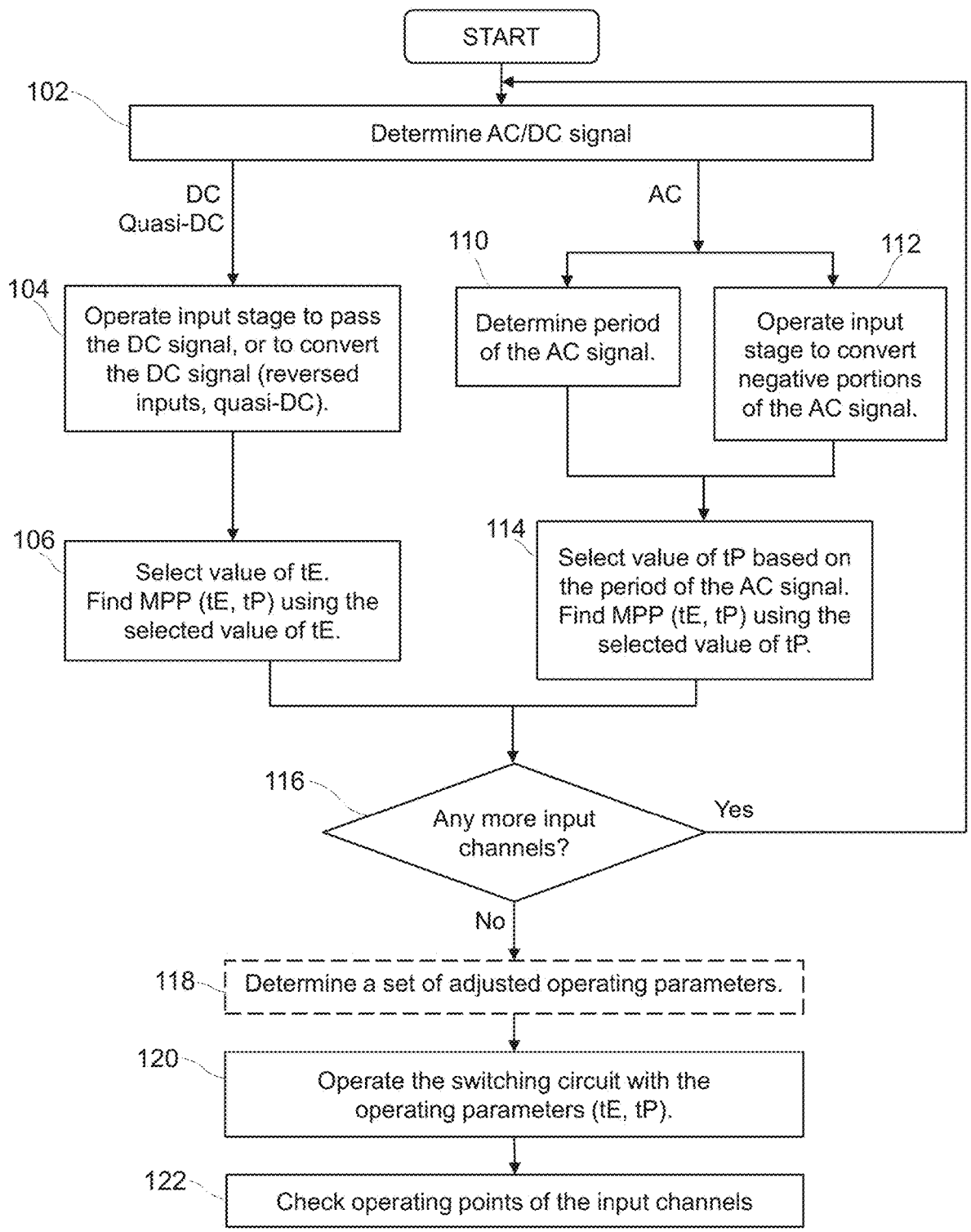
FIG. 16 shows a method of operating the power management apparatus.

FIG. 16 shows an overview of a method of operating the power management apparatus. The method is performed by the controller 30. At block 102, the method determines if the input signal is DC/quasi-DC or AC. If block 102 determines that the input signal is a DC signal, the method proceeds to block 104. The input stage (41, FIG. 2) is controlled to pass the DC signal without conversion, or with conversion if the polarity of the inputs are reversed as shown in FIG. 9 (*ii*). If block 102 determines that the input signal is a quasi-DC signal, the input stage (41, FIG. 2) is controlled to convert portions of the quasi-DC signal. At block 106, the controller determines a MPP by selecting a value of tE and then finding a value of tP which gives the MPP. The MPP can be found by an iterative process of selecting a value of tP and monitoring tD which is indicative of power. As described above, the MPP can be found by a hill-climbing algorithm testing different values of tE and tP, or by some other algorithm.

If block 102 determines that the input signal is an AC signal, the method proceeds to blocks 110 and 112. Block 110 determines the period (or half cycle period) of the input AC signal. At block 112 the input stage is controlled to convert the negative voltage portions of the AC signal. At block 114, the controller determines a MPP by selecting a value of tP, based on the period of the input AC signal, and then finding a value of tE which gives the MPP. The MPP can be found by an iterative process of selecting a value of tE and monitoring tD which is indicative of power.

The method is repeated for each of the input channels 21-24 of the power management apparatus 20. Block 116 checks if there are any more input channels to compute. The set of input signals at input channels 21-24 may be one of: all DC signals; all AC signals; or a mix of DC and AC signals. Optionally, the method may adjust the operating parameters for one or more of the input channels at block 118 before proceeding to block 120. At block 120 the controller 30 operates the switching circuit using the operating parameters for each of the input channels.

For an AC input signal, the controller 30 may not perform an energy harvesting cycle at the zero-crossing point of an AC cycle of an input signal, or may not perform an energy harvesting cycle within a window of time around the zero-crossing point of an AC cycle of an input sgnal. This is because there is minimal energy in this part of the input signal, and the inductor time could be better utilised harvesting energy from another input channel, or performing another task.

During operation, conditions can change. For example, light levels may vary, causing a PV source to appear more resistive, which can cause the set of parameters calculated at block 106 and block 114 to be non-optimal. At block 122, the method checks whether each of the input channels are still operating at the MPP. This can be achieved by modifying one of the operating parameters tP or tE from values tE1, tP1 and monitoring the change in power. If the source is still operating at the MPP, the monitored power at a higher parameter value (e.g. tE increased from tE1) and the monitored power at a lower parameter value (e.g. tE decreased from tE1) will be lower power. If the method determines that a change is required to the operating parameters (tE, tP) for an individual channel, then the method can return to block 106 (for a DC input signal) or block 114 (for an AC input signal) and recompute the MPP. While FIG. 16 shows blocks arranged sequentially in a particular order, it will be understood that at least some of the functions may be performed concurrently, or in a different order.

Figure 17:
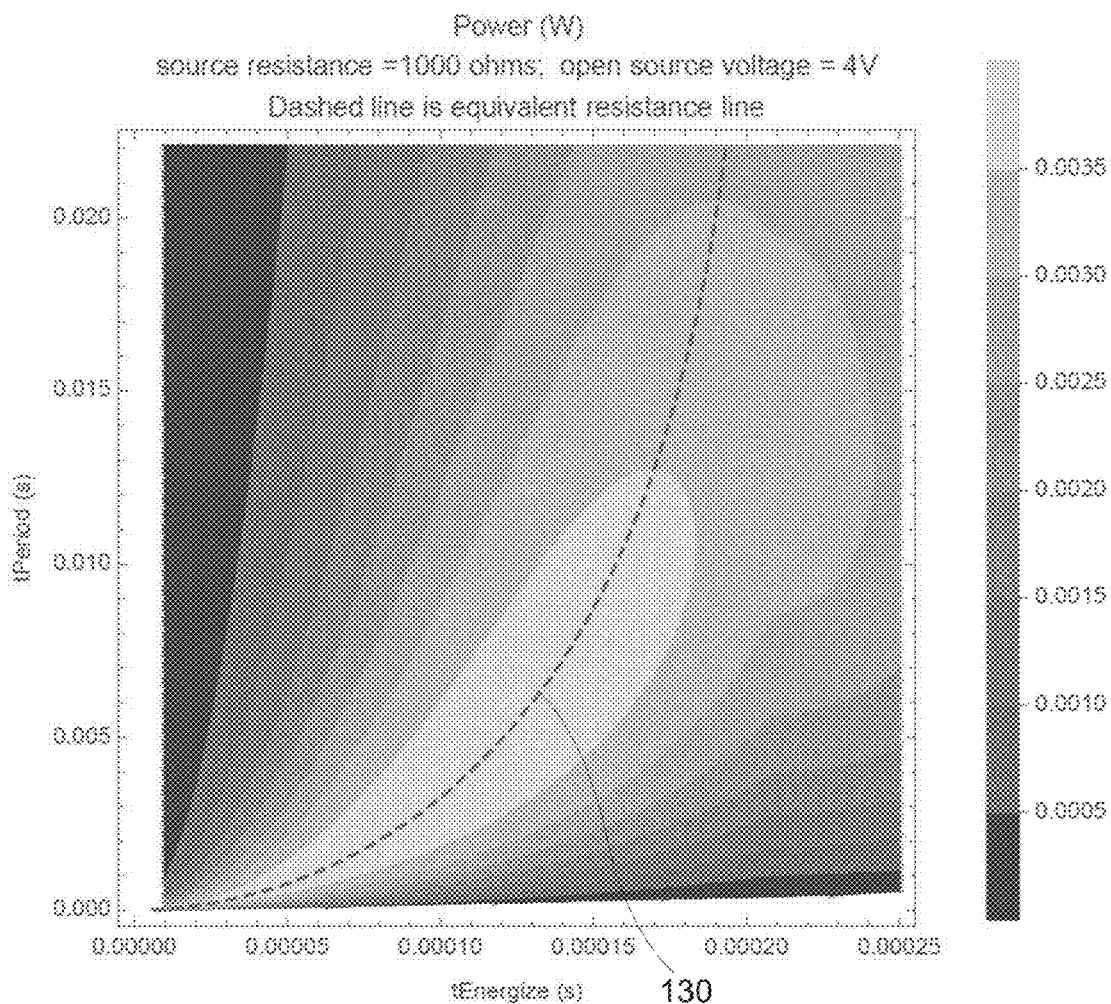
FIG. 17 shows a graph relating operating parameters (tE, tP) and equivalent impedance.

FIG. 17 shows an example of a contour plot relating operating parameters (tE, tP) and power. Regions of the same shade are equal power. Dashed line 130 is a line which represents values of tE and tP which meet the requirement that the source impedance matches the power management apparatus/load impedance, i.e. the MPP. It can be seen that there are many different combinations of pairs of tE and tP for the MPP. Some of these are more desirable than others. It can be advantageous to increase tE because tP is related to tE by a square law relationship. An increase to tE increases tP by a square law relationship and reduces the utilisation factor. However, there are practical limits on tE. Increasing tE increases inductor current and increases resistive ($I^2R$) losses. Also, increasing tE and tP causes more ripple on the output signal.

Figure 18:
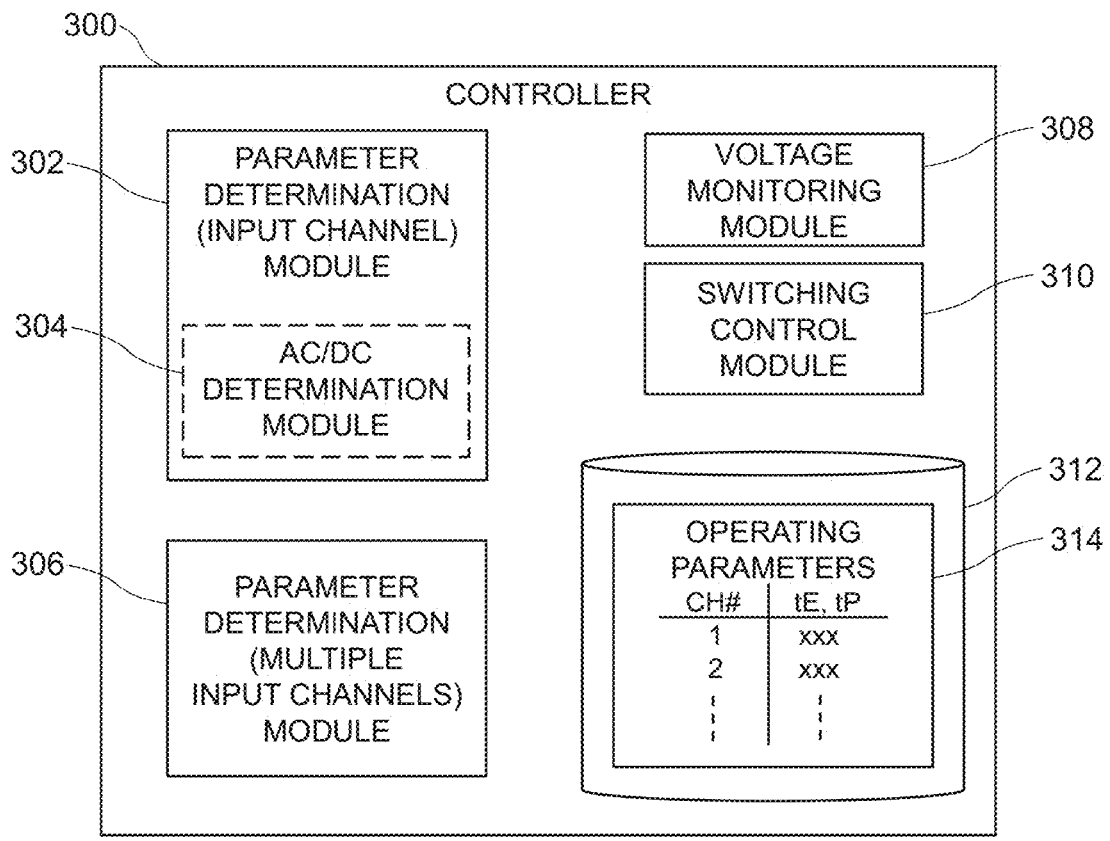
FIG. 18 schematically shows a processing apparatus for implementing the controller.

FIG. 18 schematically shows an example of a processing apparatus 300 which may be used to implement the controller 30. The processing apparatus 300 comprises a parameter determination module 302 which is configured to determine operating parameters for an input channel. Module 302 comprises a module 304 which is configured to determine whether the input signal is DC or AC. The processing apparatus 300 comprises a parameter determination module 306 which is configured to determine adjusted operating parameters for a plurality of input channels. The processing apparatus 300 comprises a voltage monitoring module 308 which is configured to monitor voltages. The voltage monitoring module 308 is used by the parameter determination module 302, in conjunction with a timer, to measure "pseudo power" as described above.

The processing apparatus 300 comprises a switching control module 308 which is configured to control the switching circuit 28 (FIG. 2). The processing apparatus 300 comprises a store 312 which is configured to store data used by the other modules. Store 312 is configured to store operating parameter values 314 for the input channels. Store 312 can store initial values for tE and tP for use in the methods of finding a MPP. Module 302 is configured to determine initial values of the operating parameter values 314. Module 306 is configured to adjust the initial values of the operating parameter values 314.

Figure 19:
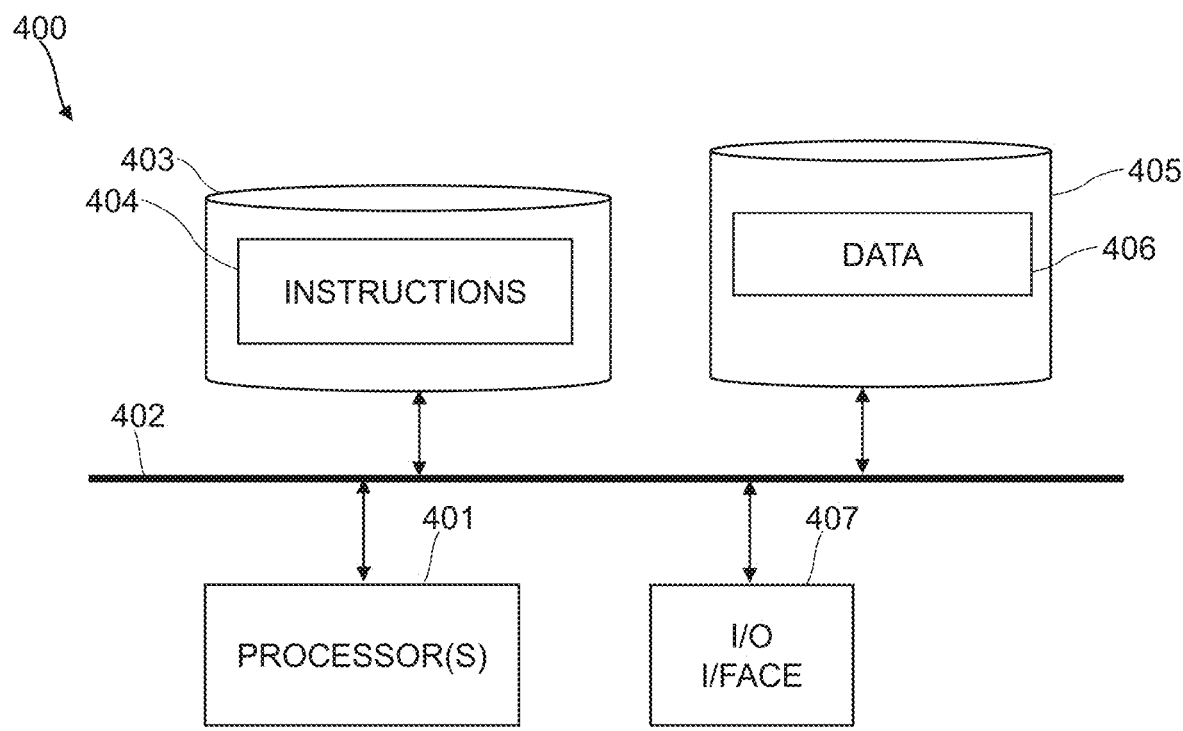
FIG. 19 schematically shows another processing apparatus for implementing the controller.

FIG. 19 shows another example of a processing apparatus 400 which may be used to implement the controller 30. Processing apparatus 400 comprises one or more processors 401 which may be any type of processor for executing instructions to control the operation of the device. The processor 401 is connected to other components of the apparatus via one or more buses 402. Processor-executable instructions 404 may be provided using any data storage device or computer-readable media, such as memory 403. The processor-executable instructions 404 comprise instructions for implementing the functionality of the described methods. The memory 403 is of any suitable type such as non-volatile memory, a magnetic or optical storage device. Memory 405, or memory 403, stores data used by the processor. The processing apparatus 400 comprises an I/O interface 407.

In this description, the inductor 34 has a single coil. It is also possible to use an inductor comprising a single coil with a plurality of tap points to allow connections to be made to the coil at different positions along its length, or an inductor comprising a plurality of coils which are magnetically coupled to each other (e.g. by sharing a common magnetic core). The inductor can be of the form described in UK Patent GB 2 553 367. In an example with an inductor having a plurality of tap points, the controller can connect to any of the tap points during the energise phase of a transfer between an input channel and the energy store. The controller can connect to any of the tap points during the de-energise phase of a transfer between an input channel and the energy store. The tap points used in the energise phase and the de-energise phase can be the same, or different. Similarly, the controller can connect to any of the tap points during the energise phase of a transfer from the energy store to the load. The controller can connect to any of the tap points during the de-energise phase of a transfer from the energy store to the load. The tap points used in the energise phase and the de-energise phase can be the same, or different. The different tap points provide a set of different "gears".

The power management apparatus 20 can be implemented as a power management integrated circuit (PMIC). The functionality of the power management apparatus, including the switching circuit 28 and controller 30 may be implemented as a single integrated circuit (e.g. a single mixed-signal integrated circuit) or as a plurality of integrated circuits (e.g. an integrated circuit with analog circuits and an integrated circuit with digital circuits). The PMIC has inputs 21-24 for connecting to external energy harvesting sources 11-14. The PMIC has connections or terminals 27 for connecting to an external inductor 34. The PMIC has at least one output 26 for connecting to a load (or multiple loads). The PMIC and inductor 34 may be provided on the same printed circuit board (PCB). The PMIC has an output 25 for connecting to an energy store 32. The PMIC and energy store 32 may be provided on the same printed circuit board (PCB). The PMIC may have an output 29 for connecting to an internal energy store 33. The PMIC and internal energy store are typically provided on the same PCB.

In another example implementation, the controller 30 can be implemented as a processor (e.g. microcontroller or microprocessor) which is separate to the power management apparatus 20. The processor can execute instructions to perform the method described above.

The invention claimed is:
1. A power management apparatus comprising:
a first energy harvesting input channel for connecting to a first electrical energy harvesting source, the first energy harvesting input channel comprising a first input line and a second input line;
a first energy storage element connection for connecting to an energy storage element;
an inductor connection for connecting to an inductor;
a switching circuit which is configured to selectively connect to the first energy harvesting input channel, the inductor connection and the first energy storage element connection; and
a controller which is configured to:
operate the switching circuit to transfer energy between the first energy harvesting input channel and the first energy storage element connection by a sequence of energy transfer cycles, each of the energy transfer cycles comprising:
an energise phase in which energy is transferred from the first energy harvesting input channel to the inductor connection for an energise time (tE) to transfer energy to the inductor and;
a de-energise phase in which energy is transferred from the inductor connection to the first energy storage element connection for a de-energise time (tD),
wherein the first energy harvesting input channel is allocated a plurality of the energy transfer cycles, with a harvesting cycle period (tP) between start times of successive energy transfer cycles;

wherein the first energy harvesting input channel is capable of receiving an electrical signal from the set of an AC electrical signal and a DC electrical signal and the controller is configured to determine a type of an electrical signal received at the first energy harvesting input channel, where the type is one of an AC electrical signal and a DC electrical signal, and determine an energise time (tE) and a harvesting cycle period (tP) for the switching circuit based on the determined type, and wherein the controller is configured to determine a type of an electrical signal received at the first energy harvesting input channel by detecting a relative polarity of a signal on the first input line and a signal on the second input line.

2. An apparatus according to claim 1 wherein, when the type of electrical signal received at the first energy harvesting input channel is determined to be an AC electrical signal, the controller is configured to determine a period of the AC electrical signal and to determine the harvesting cycle period (tP) for the first energy harvesting input channel based on the period of the AC electrical signal.

3. An apparatus according to claim 2 wherein the harvesting cycle period (tP) for the first energy harvesting input channel is a fraction of the period of the AC electrical signal.

4. An apparatus according to claim 1 wherein, when the type of electrical signal received at the first energy harvesting input channel is determined to be an AC electrical signal, the controller is configured to:
select a value of the harvesting cycle period (tP) as a constant value; and
adjust the energise time (tE) to control an amount of power transferred from the first electrical energy harvesting source connected to the first energy harvesting input channel.

5. An apparatus according to claim 4 wherein the controller is configured to determine a value of the energise time (tE) which transfers a maximum power from the first electrical energy harvesting source connected to the first energy harvesting input channel.

6. An apparatus according to claim 1 wherein, when the type of electrical signal received at the first energy harvesting input channel is determined to be an AC electrical signal, the controller is configured to determine a parameter indicative of power transferred from the first energy harvesting input channel at a controlled offset time with respect to a start of an AC cycle of the AC electrical signal.

7. An apparatus according to claim 6 wherein the controlled offset time corresponds to a peak region of the AC electrical signal.

8. An apparatus according to claim 6 wherein the controller is configured to:
select a value of the harvesting cycle period (tP) as a constant value; and
select a first value of the energise time (tE);
determine a first parameter indicative of power transferred from the first energy harvesting input channel at a first offset time with respect to a start of an AC cycle of the AC electrical signal;
select a second value of the energise time (tE); and
determine a second parameter indicative of power transferred from the first energy harvesting input channel at the first offset time with respect to a start of an AC cycle of the AC electrical signal.

9. An apparatus according to claim 6 wherein the controller is configured to:
select a value of the harvesting cycle period (tP) as a constant value; and
select a first value of the energise time (tE);
determine a first parameter indicative of power transferred from the first energy harvesting input channel at a first offset time with respect to a start of an AC cycle of the AC electrical signal;
select a second value of the energise time (tE);
determine a second parameter indicative of power transferred from the first energy harvesting input channel at a second offset time with respect to a start of an AC cycle of the AC electrical signal.

10. An apparatus according to claim 9 wherein the controller is configured to adjust at least one of the first parameter and the second parameter based on the respective offset time.

11. An apparatus according to claim 1 wherein, when the type of electrical signal received at the first energy harvesting input channel is determined to be an AC electrical signal, the controller is configured to determine a parameter indicative of power transferred from the first energy harvesting input channel by:
determining a plurality of parameters indicative of power transferred from the first energy harvesting input channel at a plurality of offset times with respect to a start of an AC cycle of the AC electrical signal; and
averaging the plurality of parameters.

12. An apparatus according to claim 1 comprising a first input stage connected to the first energy harvesting input channel and wherein, when the type of electrical signal received at the first energy harvesting input channel is determined to be an AC electrical signal, the controller is configured to cause the first input stage to convert negative voltage portions of the AC electrical signal to positive voltages.

13. An apparatus according to claim 1 wherein, when the type of electrical signal received at the first energy harvesting input channel is determined to be a DC electrical signal, the controller is configured to:
select a value of the energise time (tE) as a constant value; and
adjust the harvesting cycle period (tP) to control an amount of power transferred from the first electrical energy harvesting source connected to the first energy harvesting input channel.

14. An apparatus according to claim 13 wherein the controller is configured to determine a value of the harvesting cycle period (tP) which transfers a maximum power from the first electrical energy harvesting source connected to the first energy harvesting input channel.

15. An apparatus according to claim 1 wherein the controller is configured to determine a measure indicative of power transferred from the first energy harvesting input channel by measuring the de-energise time (tD) of the de-energise phase.

16. An apparatus according to claim 1 comprising a first input stage, wherein the first input stage comprises:
the first input line and the second input line;
a first branch and a second branch connected between the first input line and the second input line, the first branch comprising a first switching device and a second switching device connected in series and the second branch comprising a third switching device and a fourth switching device connected in series;
an output line connected to a mid-point of the first branch;
a ground connection to a mid-point of the second branch;

wherein the controller is configured to selectively:
operate the switching devices in a first configuration, wherein the first switching device is closed to connect the first input line to the output line and the fourth switching device is closed to connect the second input line to ground; and
operate the switching devices in a second configuration, wherein the second switching device is closed to connect the second input line to the output line and the third switching device is closed to connect the first input line to ground.

17. An apparatus according to claim 16 wherein the controller is configured to operate the switching devices in the first configuration when there is a positive relative difference between the first input line and the second input line and to operate the switching devices in the second configuration when there is a positive relative difference between the second input line and the first input line.

18. An apparatus according to claim 1 comprising a second energy harvesting input channel for connecting to a second electrical energy harvesting source; wherein the switching circuit is configured to selectively connect to the second energy harvesting input channel; and
the controller is configured to operate the switching circuit to transfer energy between each of the energy harvesting input channels and the first energy storage element output by a sequence of energy transfer cycles in a time-multiplexed manner.

19. An apparatus according to claim 18, wherein the second energy harvesting input channel is capable of receiving an electrical signal from the set of an AC electrical signal and a DC electrical signal and the controller is configured to determine a type of an electrical signal received at the second energy harvesting input channel, where the type is one of an AC electrical signal and a DC electrical signal, and determine an energise time (tE) and a harvesting cycle period (tP) for the switching circuit based on the determined type.

20. An apparatus according to claim 1 wherein the power management apparatus comprises a load output, the switching circuit is configured to selectively connect to the load output and the controller is also configured to operate the switching circuit to transfer energy from the first energy storage element connection to the load output via the inductor connection.

21. An apparatus according to claim 20 wherein the controller is configured to operate the switching circuit to transfer energy from the first energy storage element connection to the load output by a plurality of transfer cycles, each transfer cycle comprising:
an energise phase in which energy is transferred from the first energy storage element connection to the inductor connection for an energise time (tE) to transfer energy to the inductor and;
a de-energise phase in which energy is transferred from the inductor connection to the load output for a de-energise time (tD).

22. An apparatus according to claim 1 wherein the controller is configured, during operation, to:
determine if the first energy harvesting input channel is operating substantially at a maximum power point; and
if the first energy harvesting input channel is no longer operating substantially at a maximum power point, determine a new energise time (tE) and a new harvesting cycle period (tP) for the first energy harvesting input channel.

23. A power management system comprising:
a power management apparatus according to claim 1;
an inductor connected to the inductor connection of the power management apparatus;
a first energy store connected to the first energy storage element connection of the power management apparatus.

24. A method of controlling a power management apparatus, the power management apparatus comprising an inductor connection for connecting to an inductor, a first energy harvesting input channel for connecting to a first electrical energy harvesting source, a first energy storage element output for connecting to an energy storage element and a switching circuit, the first energy harvesting input channel comprising a first input line and a second input line, the method comprising:
operating the switching circuit to transfer energy between the first energy harvesting input channel and the first energy storage element connection by a sequence of energy transfer cycles, each of the energy transfer cycles comprising:
an energise phase in which energy is transferred from the first energy harvesting input channel to the inductor connection for an energise time (tE) to transfer energy to the inductor and;
a de-energise phase in which energy is transferred from the inductor connection to the first energy storage element connection for a de-energise time (tD),
wherein the first energy harvesting input channel is allocated a plurality of the energy transfer cycles, with a harvesting cycle period (tP) between start times of successive energy transfer cycles;
wherein the first energy harvesting input channel is capable of receiving an electrical signal from the set of an AC electrical signal and a DC electrical signal and the method comprises determining a type of an electrical signal received at the first energy harvesting input channel, where the type is one of an AC electrical signal and a DC electrical signal, and determining an energise time (tE) and a harvesting cycle period (tP) for the switching circuit based on the determined type, and
wherein the method comprises determining a type of an electrical signal received at the first energy harvesting input channel by detecting a relative polarity of a signal on the first input line and a signal on the second input line.

25. A method according to claim 24 comprising, when the type of electrical signal received at the first energy harvesting input channel is determined to be an AC electrical signal, determining a period of the AC electrical signal and determining the harvesting cycle period (tP) for the first energy harvesting input channel based on the period of the AC electrical signal.

26. A method according to claim 25 wherein the harvesting cycle period (tP) for the first energy harvesting input channel is a fraction of the period of the AC electrical signal.

27. A method according to claim 24 comprising, when the type of electrical signal received at the first energy harvesting input channel is determined to be an AC electrical signal:
selecting a value of the harvesting cycle period (tP) as a constant value; and
adjusting the energise time (tE) to control an amount of power transferred from the first electrical energy harvesting source connected to the first energy harvesting input channel.

28. A method according to claim 27 comprising determining a value of the energise time (tE) which transfers a maximum power from the electrical energy harvesting source connected to the first energy harvesting input channel.

29. A method according to claim 24 comprising, when the type of electrical signal received at the first energy harvesting input channel is determined to be an AC electrical signal, determining a parameter indicative of power transferred from the first energy harvesting input channel at a controlled offset time with respect to a start of an AC cycle of the AC electrical signal.

30. A method according to claim 29 wherein the controlled offset time corresponds to a peak region of the AC electrical signal.

31. A method according to claim 29 comprising:
selecting a value of the harvesting cycle period (tP) as a constant value; and
selecting a first value of the energise time (tE);
determining a first parameter indicative of power transferred from the first energy harvesting input channel at a first offset time with respect to a start of an AC cycle of the AC electrical signal;
selecting a second value of the energise time (tE); and
determining a second parameter indicative of power transferred from the first energy harvesting input channel at the first offset time with respect to a start of an AC cycle of the AC electrical signal.

32. A method according to claim 29 comprising:
selecting a value of the harvesting cycle period (tP) as a constant value; and
selecting a first value of the energise time (tE);
determining a first parameter indicative of power transferred from the first energy harvesting input channel at a first offset time with respect to a start of an AC cycle of the AC electrical signal;
selecting a second value of the energise time (tE);
determining a second parameter indicative of power transferred from the first energy harvesting input channel at a second offset time with respect to a start of an AC cycle of the AC electrical signal.

33. A method according to claim 32 comprising adjusting at least one of the first parameter and the second parameter based on the respective offset time.

34. A method according to claim 24 comprising, when the type of electrical signal received at the first energy harvesting input channel is determined to be an AC electrical signal, determining a parameter indicative of power transferred from the first energy harvesting input channel by:
determining a plurality of parameters indicative of power transferred from the first energy harvesting input channel at a plurality of offset times with respect to a start of an AC cycle of the AC electrical signal; and
averaging the plurality of parameters.

35. A method according to claim 24 wherein the power management apparatus comprises a first input stage connected to the first energy harvesting input channel and the method comprises, when the type of electrical signal received at the first energy harvesting input channel is determined to be an AC electrical signal, causing the first input stage to convert negative voltage portions of the AC electrical signal to positive voltages.

36. A method according to claim 24 comprising, when the type of electrical signal received at the first energy harvesting input channel is determined to be a DC electrical signal:
selecting a value of the energise time (tE) as a constant value; and
adjusting the harvesting cycle period (tP) to control an amount of power transferred from the first electrical energy harvesting source connected to the first energy harvesting input channel.

37. A method according to claim 36 comprising determining a value of the harvesting cycle period (tP) which transfers a maximum power from the first electrical energy harvesting source connected to the first energy harvesting input channel.

38. A method according to claim 24 comprising determining a measure indicative of power transferred from the first energy harvesting input channel by measuring the de-energise time (tD) of the de-energise phase.

39. A method according to claim 24, wherein the power management apparatus comprises a second energy harvesting input channel for connecting to a second electrical energy harvesting source; and the method comprises operating the switching circuit to transfer energy between each of the energy harvesting input channels and the first energy storage element output by a sequence of energy transfer cycles in a time-multiplexed manner.

40. A method according to claim 24 wherein the power management apparatus comprises a load output, and the method comprises operating the switching circuit to transfer energy from the first energy storage element connection to the load output via the inductor connection.

41. A method according to claim 24 comprising, during operation:
determining if the first energy harvesting input channel is operating substantially at a maximum power point; and
if the first energy harvesting input channel is no longer operating substantially at a maximum power point, determining a new energise time (tE) and a new harvesting cycle period (tP) for the first energy harvesting input channel.

42. A controller for a power management apparatus which is configured to perform the method of claim 24.

43. A computer program product comprising a non-transitory computer-readable storage medium having instructions stored on the medium which, when the instructions are executed by a computer, cause the computer to carry out a method of
operating a switching circuit to transfer energy between a first energy harvesting input channel and a first energy storage element connection by a sequence of energy transfer cycles, each of the energy transfer cycles comprising:
an energise phase in which energy is transferred from the first energy harvesting input channel to an inductor connection for an energise time (tE) to transfer energy to the inductor and;
a de-energise phase in which energy is transferred from the inductor connection to a first energy storage element connection for a de-energise time (tD),
wherein the first energy harvesting input channel is allocated a plurality of the energy transfer cycles, with a harvesting cycle period (tP) between start times of successive energy transfer cycles;
determining a type of an electrical signal received at the first energy harvesting input channel, where the type is one of an AC electrical signal and a DC electrical signal, and determining an energise time (tE) and a harvesting cycle period (tP) for the switching circuit based on the determined type, and
determining a type of an electrical signal received at the first energy harvesting input channel by detecting a relative polarity of a signal on a first input line of the first energy harvesting input channel and a signal on a second input line of the first energy harvesting input channel.

* * * * *